(12) United States Patent
Lim et al.

(10) Patent No.: US 10,375,651 B2
(45) Date of Patent: Aug. 6, 2019

(54) UPLINK SIGNAL TRANSMISSION METHOD AND USER EQUIPMENT CAPABLE OF PROTECTING NEIGHBORING BAND FROM MOBILE SATELLITE SERVICE BAND

(71) Applicant: LG ELECTRONICS INC., Seoul (KR)

(72) Inventors: Suhwan Lim, Seoul (KR); Yoonoh Yang, Seoul (KR); Sangwook Lee, Seoul (KR); Manyoung Jung, Seoul (KR); Jinyup Hwang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/748,221

(22) PCT Filed: Aug. 11, 2016

(86) PCT No.: PCT/KR2016/008815
§ 371 (c)(1),
(2) Date: Jan. 29, 2018

(87) PCT Pub. No.: WO2017/034189
PCT Pub. Date: Mar. 2, 2017

(65) Prior Publication Data
US 2018/0220378 A1  Aug. 2, 2018

Related U.S. Application Data

(60) Provisional application No. 62/208,835, filed on Aug. 24, 2015.

(51) Int. Cl.
*H04W 52/34* (2009.01)
*H04W 52/24* (2009.01)
(Continued)

(52) U.S. Cl.
CPC ....... *H04W 52/243* (2013.01); *H04W 52/367* (2013.01); *H04W 72/08* (2013.01);
(Continued)

(58) Field of Classification Search
CPC ............. H04W 52/146; H04W 52/367; H04W 72/0413; H04W 52/34; H04W 52/243;
(Continued)

(56) References Cited

U.S. PATENT DOCUMENTS 9,374,213 B2 * 6/2016 Ahn ................. H04B 7/26
2007/0070878 A1  3/2007 Norin
(Continued)

*Primary Examiner* — Philip Sobutka
(74) *Attorney, Agent, or Firm* — Birch, Stewart, Kolasch & Birch, LLP

(57) ABSTRACT

A disclosure of the present specification provides a method for transmitting an uplink signal by a user equipment. The method may comprise the steps of: receiving a network signal for restricting a transmission power, wherein, when an uplink signal is transmitted through an uplink carrier wave in an uplink band that partially overlaps a mobile satellite service (MSS) band, the network signal is received in the case in which the uplink signal may provide interference to a personal handyphone system (PHS) band; determining a transmission power by applying additional maximum power reduction (A-MPR) on the basis of the received network signal; and transmitting the uplink signal through the uplink carrier wave according to the determined transmission power.

16 Claims, 36 Drawing Sheets

(51) Int. Cl.
*H04W 72/08* (2009.01)
*H04W 52/36* (2009.01)
H04W 52/14 (2009.01)
H04W 72/04 (2009.01)
H04L 5/00 (2006.01)
H04L 5/14 (2006.01)

(52) U.S. Cl.
CPC ............ *H04L 5/001* (2013.01); *H04L 5/0062* (2013.01); *H04L 5/1469* (2013.01); *H04W 52/146* (2013.01); *H04W 72/0413* (2013.01)

(58) Field of Classification Search
CPC ............ H04W 72/0473; H04W 16/14; H04W 52/346; H04W 74/004; H04W 52/16; H04W 52/241; H04W 52/242; H04W 52/06; H04W 52/244; H04W 72/08; H04L 5/001; H04L 5/0062; H04L 5/1469
USPC .......................................... 455/522, 446–448
See application file for complete search history.

(56) References Cited

U.S. PATENT DOCUMENTS

| | | |
|---|---|---|
| 2010/0118805 A1 | 5/2010 | Ishii et al. |
| 2011/0319119 A1 | 12/2011 | Ishii |
| 2014/0044063 A1 | 2/2014 | Lim et al. |
| 2014/0184443 A1 | 7/2014 | Riley et al. |
| 2015/0382364 A1* | 12/2015 | Sharma ............... H04W 72/082 370/329 |

* cited by examiner

FIG. 9
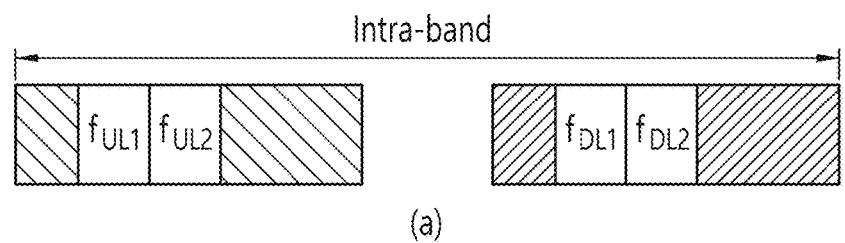
(a)
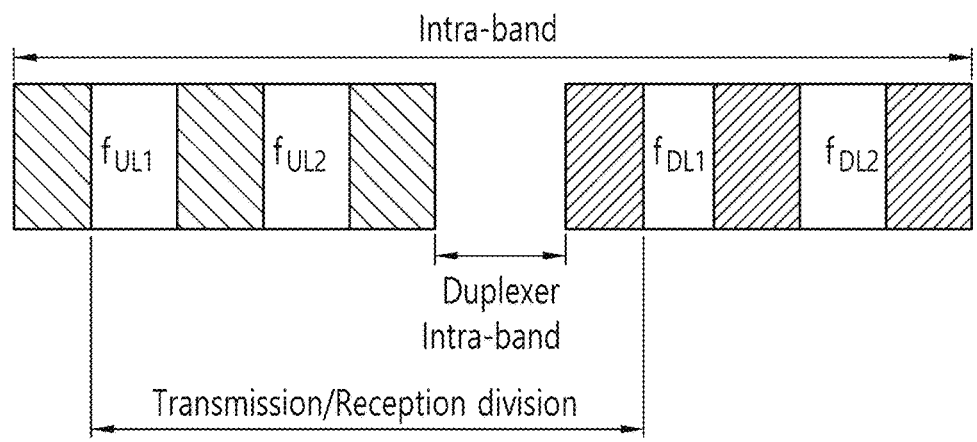
(b)

FIG. 14
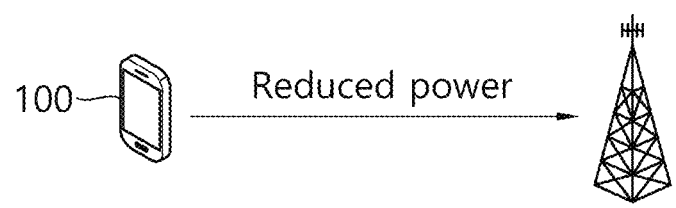
(a)
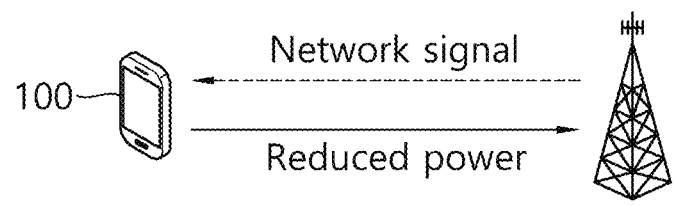
(b)

Required A-MPR mask for S-band(fc=1930 MHz, 20MHz)

Required A-MPR mask for S-band(fc=1950 MHz, 20MHz)

A-MPR simulation results (-50dBm/MHz, fc=1930MHz, 20MHz CBW)

A-MPR simulation results (-50dBm/MHz, fc=1927.5MHz, 15MHz CBW)

A-MPR simulation results (-50dBm/MHz, fc=1925MHz, 10MHz CBW)

A-MPR simulation results (-50dBm/MHz, fc=1922.5MHz, 5MHz CBW)

A-MPR simulation results (-40dBm/MHz, fc=1930MHz, 20MHz CBW)

A-MPR simulation results (-40dBm/MHz, fc=1927.5MHz, 15MHz CBW)

A-MPR simulation results (-40dBm/MHz, fc=1925MHz, 10MHz CBW)

A-MPR simulation results (-40dBm/MHz, fc=1922.5MHz, 5MHz CBW)

A-MPR simulation results (-30dBm/MHz, fc=1930MHz, 20MHz CBW)

A-MPR simulation results (-30dBm/MHz, fc=1927.5MHz, 15MHz CBW)

A-MPR simulation results (-30dBm/MHz, fc=1925MHz, 10MHz CBW)

A-MPR simulation results (-30dBm/MHz, fc=1922.5MHz, 5MHz CBW)

A-MPR simulation results (-15.5dBm/MHz, fc=1930MHz, 20MHz CBW)

A-MPR simulation results (-15.5dBm/MHz, fc=1927.5MHz, 15MHz CBW)

A-MPR simulation results (-15.5dBm/MHz, fc=1925MHz, 10MHz CBW)

A-MPR simulation results (-15.5dBm/MHz, fc=1922.5MHz, 5MHz CBW)

UPLINK SIGNAL TRANSMISSION METHOD AND USER EQUIPMENT CAPABLE OF PROTECTING NEIGHBORING BAND FROM MOBILE SATELLITE SERVICE BAND

CROSS REFERENCE TO RELATED APPLICATIONS

This application is the National Phase of PCT international Application No. PCT/KR2016/008815, filed on Aug. 11, 2016, which claims priority under 35 U.S.C. 119(e) to U.S. Provisional Application No. 62/208,835, filed on Aug. 24, 2015, all of which are hereby expressly incorporated by reference into the present application.

BACKGROUND OF THE INVENTION

Field of the Invention

The present invention relates to an uplink signal transmission method and a user equipment in mobile communication.

Related Art

3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink.

Recently, the development of 3GPP LTE-Advanced (LTE-A), an evolution of 3GPP LTE, has been completed. According to the LTE-A, a carrier aggregation (CA) technique in which a plurality of bands are used together is proposed.

Frequency bands, i.e., carriers, which may be used for LTE/LTE-A have been defined by 3GPP while considering the radio propagation conditions in of diverse countries.

Meanwhile, a Mobile Satellite Service (MSS) provides mobile communication services by using satellite. 3GPP has approved bands of 1980 MHz-2010 MHz and bands of 2170 MHz-2200 MHz as bands for providing MSS.

However, as the usage rate of MSS failed to reach a high level, 3GPP has granted an approval for part of the bands for the MSS to be used for another purpose. Accordingly, this led to the need of a solution for protecting bands neighboring the bands for the MSS.

SUMMARY OF THE INVENTION

Technical Objects

Therefore, a purpose of a disclosure of this specification is to provide an uplink signal transmission method capable of protecting a neighboring band from a mobile satellite service band.

Moreover, a purpose of another disclosure of this specification is to provide an uplink signal transmission user equipment capable of a protecting neighboring band from a mobile satellite service band.

Technical Solutions

In order to achieve the above-described technical object, a disclosure of this specification provides a method for transmitting an uplink signal by a user equipment. The method includes receiving a network signal for limiting transmission power. The network signal may be received when the uplink signal is transmitted through an uplink carrier within an uplink band overlapping with part of a mobile satellite service (MSS) band such that the uplink signal is likely to cause interference to a personal handyphone system (PHS) band. The method may comprise: determining a transmission power by adopting additional maximum power reduction (A-MPR) based on the received network signal, and transmitting the uplink signal through the uplink carrier in accordance with the determined transmission power. When the uplink band corresponds to evolved-universal terrestrial radio access (E-UTRA) band 65, a value being indicated by the network signal may be different from a value being indicated by a network signal for the E-UTRA band 1 that is positioned to be adjacent to the MSS band.

The E-UTRA band 65 may overlap with part of the E-UTRA band 1.

The network signal may correspond to a network signal allowing resource block allocation to be performed by applying the A-MPR for a frequency in which the resource block allocation is limited, when the transmission power is limited in accordance with the network signal for the E-UTRA band 1.

When a frequency distance between a boundary frequency of the uplink band and the PHS band is equal to 4.3 MHz, a value of the A-MPR may be equal to 9 dB. And, a spurious emission protection level for the PHS band of the uplink band may correspond to −41 dBm/300 kHz.

Also, the uplink carrier for transmitting the uplink signal may correspond to 1920 MHz-1940 MHz.

In order to achieve the above-described technical object, another disclosure of this specification provides a user equipment for transmitting an uplink signal. The user equipment includes a radio frequency (RF) unit configured to transmit and receive radio signals through a band overlapping with part of a mobile satellite service (MSS) band, and a processor controlling the RF unit. The processor may control the RF unit thereby receiving a network signal for limiting transmission power.

The network signal may be received when the uplink signal is transmitted through an uplink carrier within an uplink band overlapping with part of a mobile satellite service (MSS) band such that the uplink signal is likely to cause interference to a personal handyphone system (PHS) band. The processor determines a transmission power by adopting additional maximum power reduction (A-MPR) based on the received network signal. The processor may control the RF unit thereby transmitting the uplink signal through the uplink carrier in accordance with the determined transmission power. When the uplink band corresponds to evolved-universal terrestrial radio access (E-UTRA) band 65, a value being indicated by the network signal is different from a value being indicated by a network signal for the E-UTRA band 1 that is positioned to be adjacent to the MSS band.

Effects of the Invention

According to the disclosure of this specification, when performing uplink signal transmission, a neighboring band may be protected from a mobile satellite service band.

BRIEF DESCRIPTION OF THE DRAWINGS

FIG. 9 is a concept view illustrating intra-band carrier aggregation (CA).

FIG. 14 is an exemplary diagram showing a method for limiting the transmission power of a user equipment.

DESCRIPTION OF EXEMPLARY EMBODIMENTS

Figure 1:
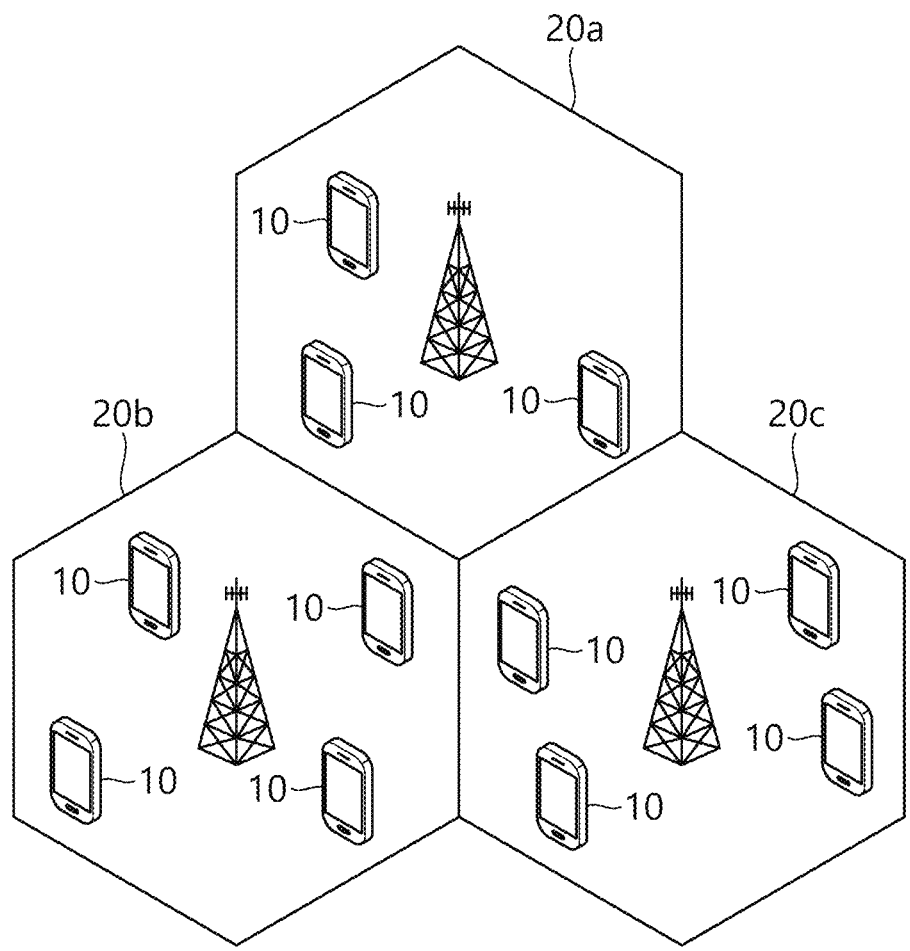
FIG. 1 illustrates a wireless communication system.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'wireless device' may be stationary or mobile, and may be denoted by other terms such as terminal, mobile terminal (MT), user equipment (UE), mobile equipment (ME), mobile station (MS), user terminal (UT), subscriber station (SS), handheld device, or access terminal (AT).

As used herein, 'base station' generally refers to a fixed station that communicates with a wireless device and may be denoted by other terms such as evolved-NodeB (eNB), base transceiver system (BTS), or access point.

Hereinafter, applications of the present invention based on 3rd generation partnership project (3GPP) long term evolution (LTE) or 3GPP LTE-advanced (LTE-A) are described. However, this is merely an example, and the present invention may apply to various wireless communication systems. Hereinafter, LTE includes LTE and/or LTE-A.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c.

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE1 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Hereinafter, the LTE system will be described in detail.

Figure 2:
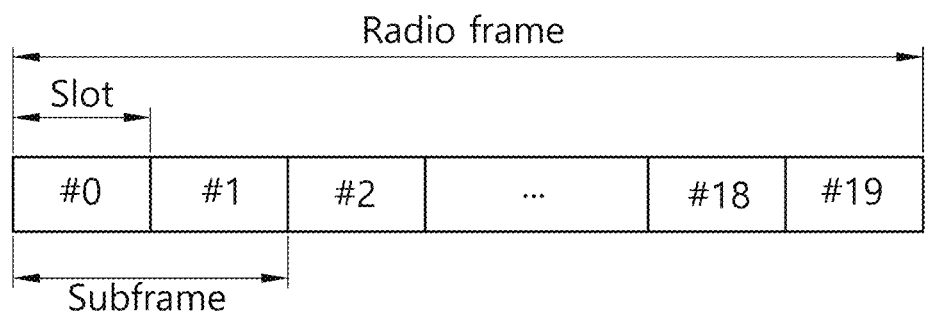
FIG. 2 illustrates the structure of a radio frame according to frequency division duplex (FDD) in 3GPP LTE.

FIG. 2 illustrates the structure of a radio frame according to FDD (frequency division duplex) in 3GPP LTE.

For the radio frame shown in FIG. 2, 3rd Generation Partnership Project (3GPP) TS 36.211 V8.2.0 (2008-03) "Technical Specification Group Radio Access Network; Evolved Universal Terrestrial Radio Access (E-UTRA); Physical channels and modulation (Release 8)", Ch. 5 may be referenced.

Referring to FIG. 2, a radio frame includes 10 sub-frames, and one sub-frame includes two slots. The slots in the radio frame are marked with slot numbers 0 through 19. The time taken for one sub-frame to be transmitted is referred to as a TTI (transmission time interval). The TTI may be the unit of scheduling for data transmission. For example, the length of one radio frame may be 10 ms, the length of one sub-frame may be 1 ms, and the length of one slot may be 0.5 ms.

The structure of a radio frame is merely an example, and the number of sub-frames included in the radio frame or the number of slots included in a sub-frame may vary differently.

Meanwhile, one slot may include a plurality of OFDM symbols. How many OFDM symbols are included in one slot may vary depending on cyclic prefix (CP).

Figure 3:
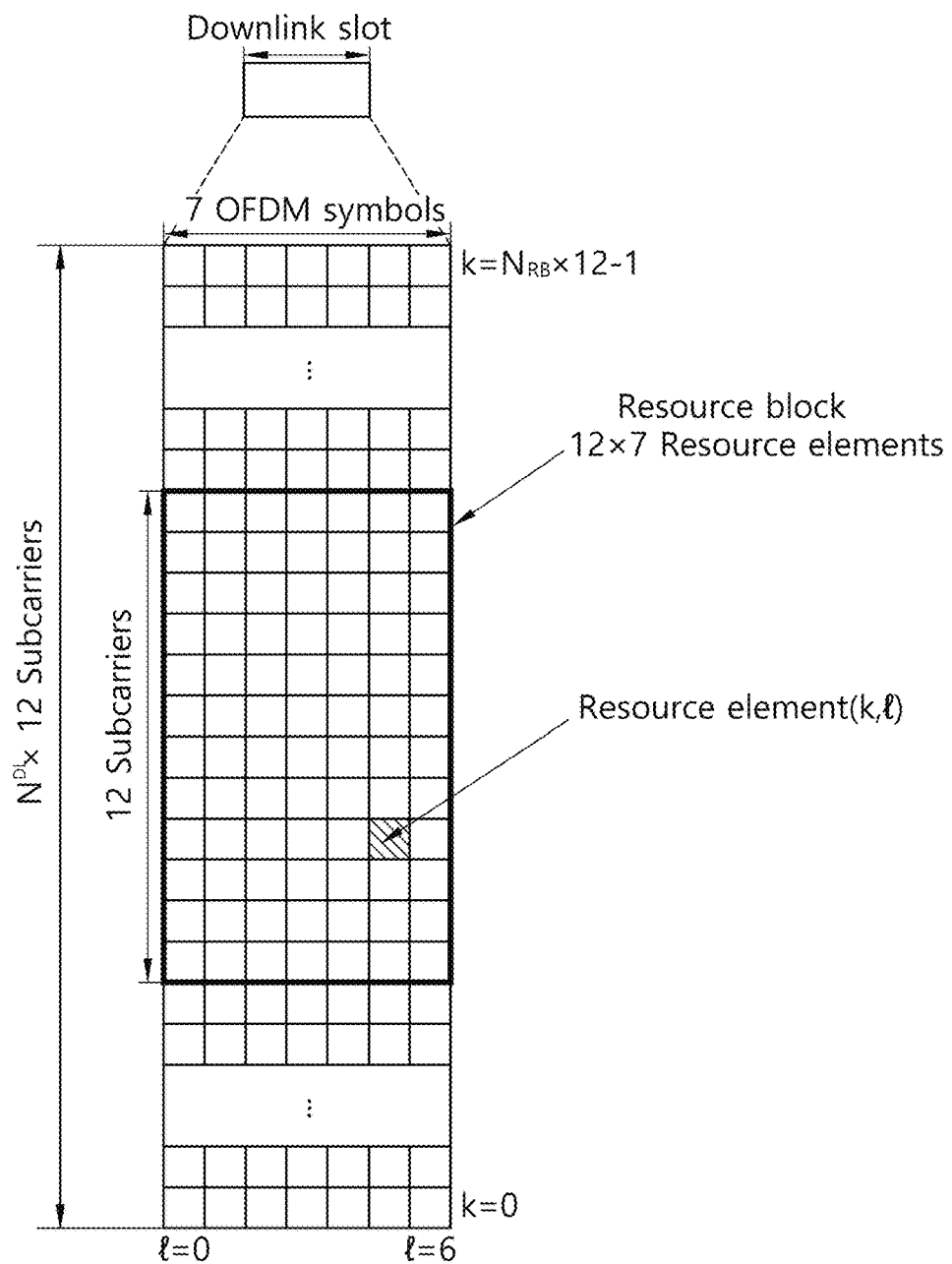
FIG. 3 illustrates an example resource grid for one uplink or downlink slot in 3GPP LTE.

FIG. 3 illustrates an example resource grid for one uplink or downlink slot in 3GPP LTE.

Referring to FIG. 3, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

Here, by way of example, one resource block includes 7×12 resource elements that consist of seven OFDM symbols in the time domain and 12 sub-carriers in the frequency domain. However, the number of sub-carriers in the resource block and the number of OFDM symbols are not limited thereto. The number of OFDM symbols in the resource block or the number of sub-carriers may be changed variously. In other words, the number of OFDM symbols may be varied depending on the above-described length of CP. In particular, 3GPP LTE defines one slot as having seven OFDM symbols in the case of CP and six OFDM symbols in the case of extended CP.

OFDM symbol is to represent one symbol period, and depending on system, may also be denoted SC-FDMA symbol, OFDM symbol, or symbol period. The resource block is a unit of resource allocation and includes a plurality of sub-carriers in the frequency domain. The number of resource blocks included in the uplink slot, i.e., NUL, is dependent upon an uplink transmission bandwidth set in a cell. Each element on the resource grid is denoted resource element.

Meanwhile, the number of sub-carriers in one OFDM symbol may be one of 128, 256, 512, 1024, 1536, and 2048.

Figure 4:
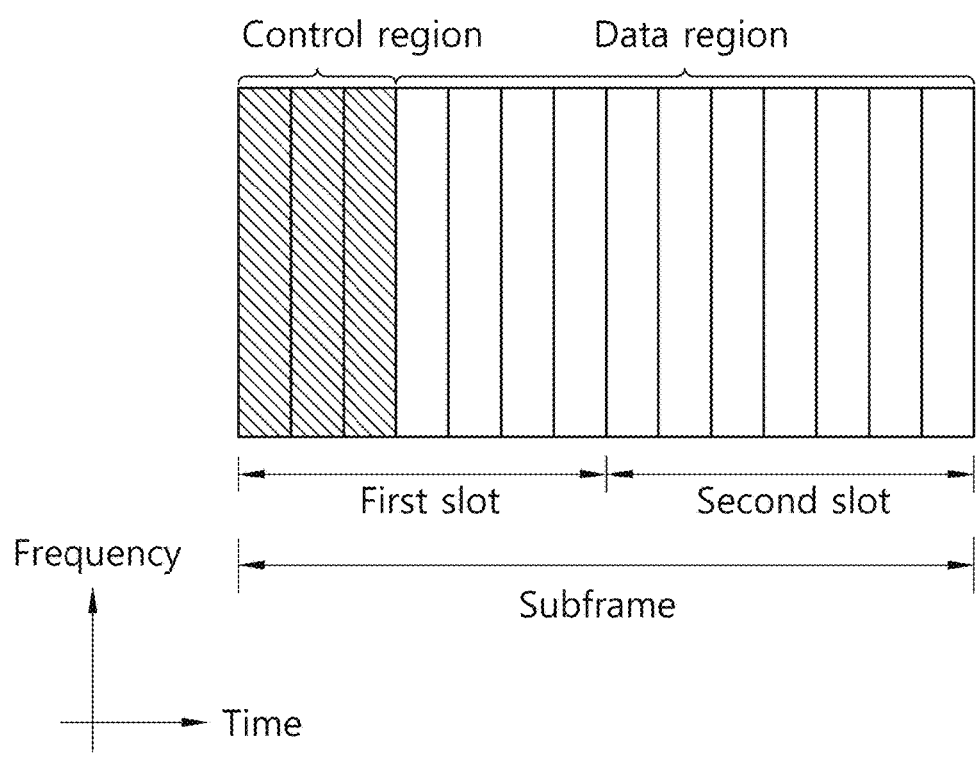
FIG. 4 illustrates the architecture of a downlink sub-frame in 3GPP LTE.

In 3GPP LTE, the resource grid for one uplink slot shown in FIG. 4 may also apply to the resource grid for the downlink slot.

FIG. 4 illustrates the architecture of a downlink sub-frame.

For this, 3GPP TS 36.211 V10.4.0 (2011-12) "Evolved Universal Terrestrial Radio Access (E-UTRA); Physical Channels and Modulation (Release 10)", Ch. 4 may be referenced.

The radio frame includes 10 sub-frames indexed 0 to 9. One sub-frame includes two consecutive slots. Accordingly, the radio frame includes 20 slots. The time taken for one sub-frame to be transmitted is denoted transmission time interval (TTI). For example, the length of one sub-frame may be 1 ms, and the length of one slot may be 0.5 ms.

One slot may include a plurality of orthogonal frequency division multiplexing (OFDM) symbols in the time domain. OFDM symbol is merely to represent one symbol period in the time domain since 3GPP LTE adopts orthogonal frequency division multiple access (OFDMA) for downlink (DL), and the multiple access scheme or name is not limited thereto. For example, the OFDM symbol may be referred to as single carrier-frequency division multiple access (SC-FDMA) symbol or symbol period.

Figure 5:
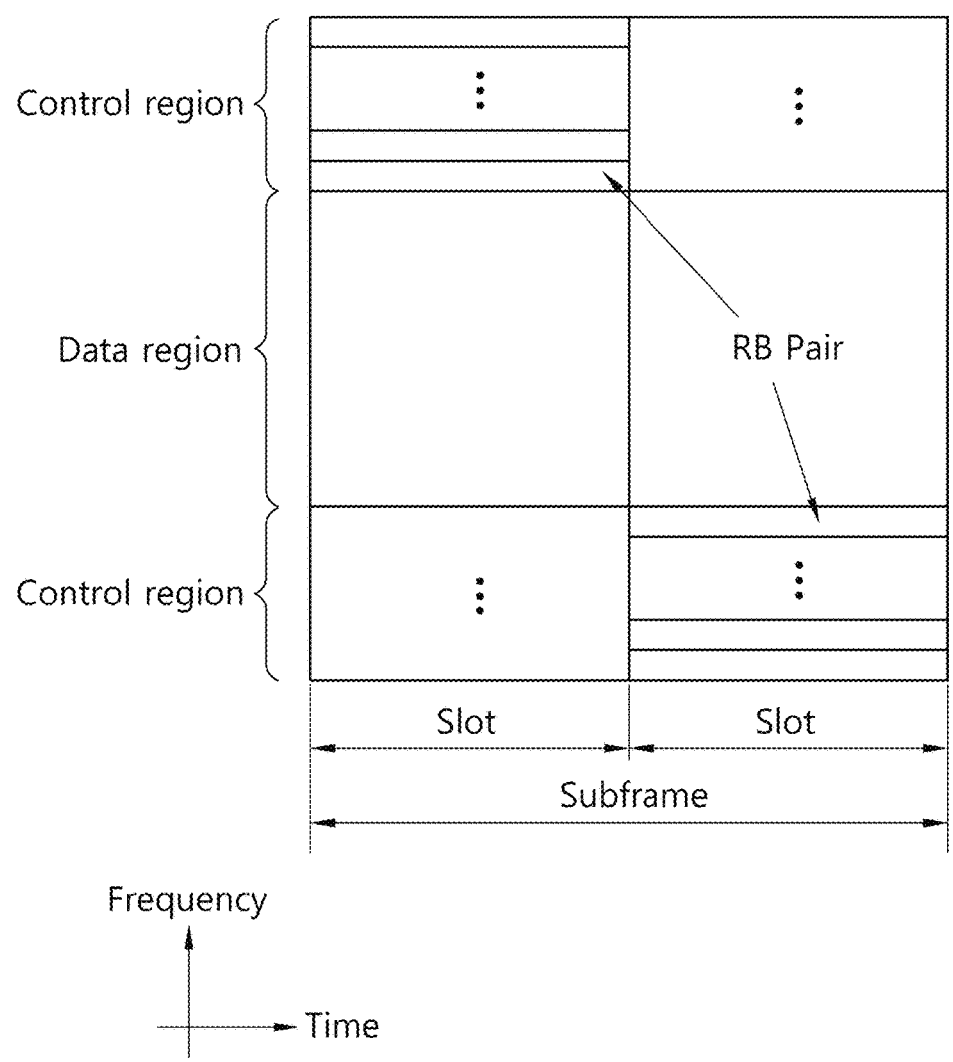
FIG. 5 illustrates the architecture of an uplink sub-frame in 3GPP LTE.

In FIG. 5, assuming the normal CP, one slot includes seven OFDM symbols, by way of example. However, the number of OFDM symbols included in one slot may vary depending on the length of CP (cyclic prefix). That is, as described above, according to 3GPP TS 36.211 V10.4.0, one slot includes seven OFDM symbols in the normal CP and six OFDM symbols in the extended CP.

Resource block (RB) is a unit for resource allocation and includes a plurality of sub-carriers in one slot. For example, if one slot includes seven OFDM symbols in the time domain and the resource block includes 12 sub-carriers in the frequency domain, one resource block may include 7×12 resource elements (REs).

The downlink (DL) sub-frame is split into a control region and a data region in the time domain. The control region includes up to first three OFDM symbols in the first slot of the sub-frame. However, the number of OFDM symbols included in the control region may be changed. A (physical downlink control channel (PDCCH) and other control channels are assigned to the control region, and a PDSCH is assigned to the data region.

As set forth in 3GPP TS 36.211 V10.4.0, the physical channels in 3GPP LTE may be classified into data channels such as physical downlink shared channel (PDSCH) and physical uplink shared channel (PUSCH) and control channels such as physical downlink control channel (PDCCH), physical control format indicator channel (PCFICH), physical hybrid-ARQ indicator channel (PHICH) and physical uplink control channel (PUCCH).

The PCFICH transmitted in the first OFDM symbol of the sub-frame carries control format indicator (CIF) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries a positive-acknowledgement (ACK)/negative-acknowledgement (NACK) signal for a UL hybrid automatic repeat request (HARQ). The ACK/NACK signal for uplink (UL) data on the PUSCH transmitted by the wireless device is sent on the PHICH.

The physical broadcast channel (PBCH) is transmitted in the first four OFDM symbols in the second slot of the first sub-frame of the radio frame. The PBCH carries system information necessary for the wireless device to communicate with the base station, and the system information transmitted through the PBCH is denoted master information block (MIB). In comparison, system information transmitted on the PDSCH indicated by the PDCCH is denoted system information block (SIB).

The PDCCH may carry activation of voice over internet protocol (VoIP) and a set of transmission power control commands for individual UEs in some UE group, resource allocation of an upper layer control message such as a random access response transmitted on the PDSCH, system information on DL-SCH, paging information on PCH, resource allocation information of uplink shared channel (UL-SCH), and resource allocation and transmission format of downlink-shared channel (DL-SCH). A plurality of PDCCHs may be sent in the control region, and the terminal may monitor the plurality of PDCCHs. The PDCCH is transmitted on one control channel element (CCE) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as downlink (DL) grant), resource allocation of PUSCH (this is also referred to as uplink (UL) grant), a set of transmission power control commands for individual UEs in some UE group, and/or activation of Voice over Internet Protocol (VoIP).

The base station determines a PDCCH format according to the DCI to be sent to the terminal and adds a cyclic redundancy check (CRC) to control information. The CRC is masked with a unique identifier (radio network temporary identifier (RNTI) depending on the owner or purpose of the PDCCH. In case the PDCCH is for a specific terminal, the terminal's unique identifier, such as cell-RNTI (C-RNTI), may be masked to the CRC. Or, if the PDCCH is for a paging message, a paging indicator, for example, paging-RNTI (P-RNTI) may be masked to the CRC. If the PDCCH is for a system information block (SIB), a system information identifier, system information-RNTI (SI-RNTI), may be masked to the CRC. In order to indicate a random access response that is a response to the terminal's transmission of a random access preamble, a random access-RNTI (RA-RNTI) may be masked to the CRC.

In 3GPP LTE, blind decoding is used for detecting a PDCCH. The blind decoding is a scheme of identifying whether a PDCCH is its own control channel by demasking a desired identifier to the cyclic redundancy check (CRC) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as radio network temporary identifier (RNTI) to the CRC depending on the owner or purpose of the PDCCH.

According to 3GPP TS 36.211 V10.4.0, the uplink channels include a PUSCH, a PUCCH, a Sounding Reference Signal (SRS), and a physical random access channel (PRACH).

FIG. 5 illustrates the architecture of an uplink sub-frame in 3GPP LTE.

Referring to FIG. 5, the uplink sub-frame may be separated into a control region and a data region in the frequency domain. The control region is assigned a physical uplink control channel (PUCCH) for transmission of uplink control information. The data region is assigned a physical uplink shared channel (PUSCH) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

Hereinafter, an SC-FDMA transmission scheme is now described.

LTE (Long-Term Evolution) adopts, for uplink, SC (Single-Carrier) FDMA that is similar to OFDM (Orthogonal Frequency Division Multiplexing).

SC-FDMA may also be referred to as DFT-s OFDM (DFT-spread OFDM). In case the SC-FDMA transmission scheme is used, a non-linear distortion section of a power amplifier may be avoided, so that transmission power efficiency may be increased in a terminal with limited power consumption. Accordingly, user throughput may be increased.

SC-FDMA is similar to OFDM in that a signal is carried over split sub-carriers using FFT (Fast Fourier Transform) and IFFT (Inverse-FFT). However, an issue with the existing OFDM transmitter lies in that signals conveyed on respective sub-carriers on frequency axis are transformed into time-axis signals by IFFT. That is, in IFFT, the same operation is operated in parallel, resulting in an increase in PAPR (Peak to Average Power Ratio). In order to prevent such PAPR increase, SC-FDMA performs IFFT after DFT spreading unlike OFDM. That is, such transmission scheme that, after DFT spreading, IFFT is conducted is referred to as SC-FDMA. Accordingly, SC-FDMA is also referred to as DFT spread OFDM (DFT-s-OFDM) in the same meaning.

As such, advantages of SC-FDMA include providing robustness over a multi-path channel that comes from the fact that it has a similar structure to OFDM while fundamentally resolving the problem of OFDM that PAPR is increased by IFFT operation, thereby enabling effective use of a power amplifier.

Meanwhile, LTE-Advanced employs a clustered DFT-s-OFDM scheme that allows non-contiguous resource allocation.

The clustered DFT-s-OFDM transmission scheme is a variation to the existing SC-FDMA transmission scheme and divides the data symbols that were subjected to a precoder into a plurality of sub-blocks and performs mapping with the sub-blocks separated from each other in the frequency domain.

Hereinafter, the LTE-A system will be described in more detail.

Some major features of the clustered DFT-s-OFDM scheme include enabling frequency-selective resource allocation so that the scheme may flexibly deal with a frequency selective fading environment.

In this case, the clustered DFT-s-OFDM scheme, unlike the conventional LTE uplink access scheme, i.e., SC-FDMA, permits non-contiguous resource allocation, so that uplink data transmitted may be split into several units of cluster.

In other words, while the LTE system is rendered to maintain single carrier characteristics in the case of uplink, the LTE-A system allows for non-contiguous allocation of DFT_precoded data on frequency axis or simultaneous transmission of PUSCH and PUCCH. In such case, the single carrier features are difficult to maintain.

<Carrier Aggregation>

A carrier aggregation system is now described.

Figure 6:
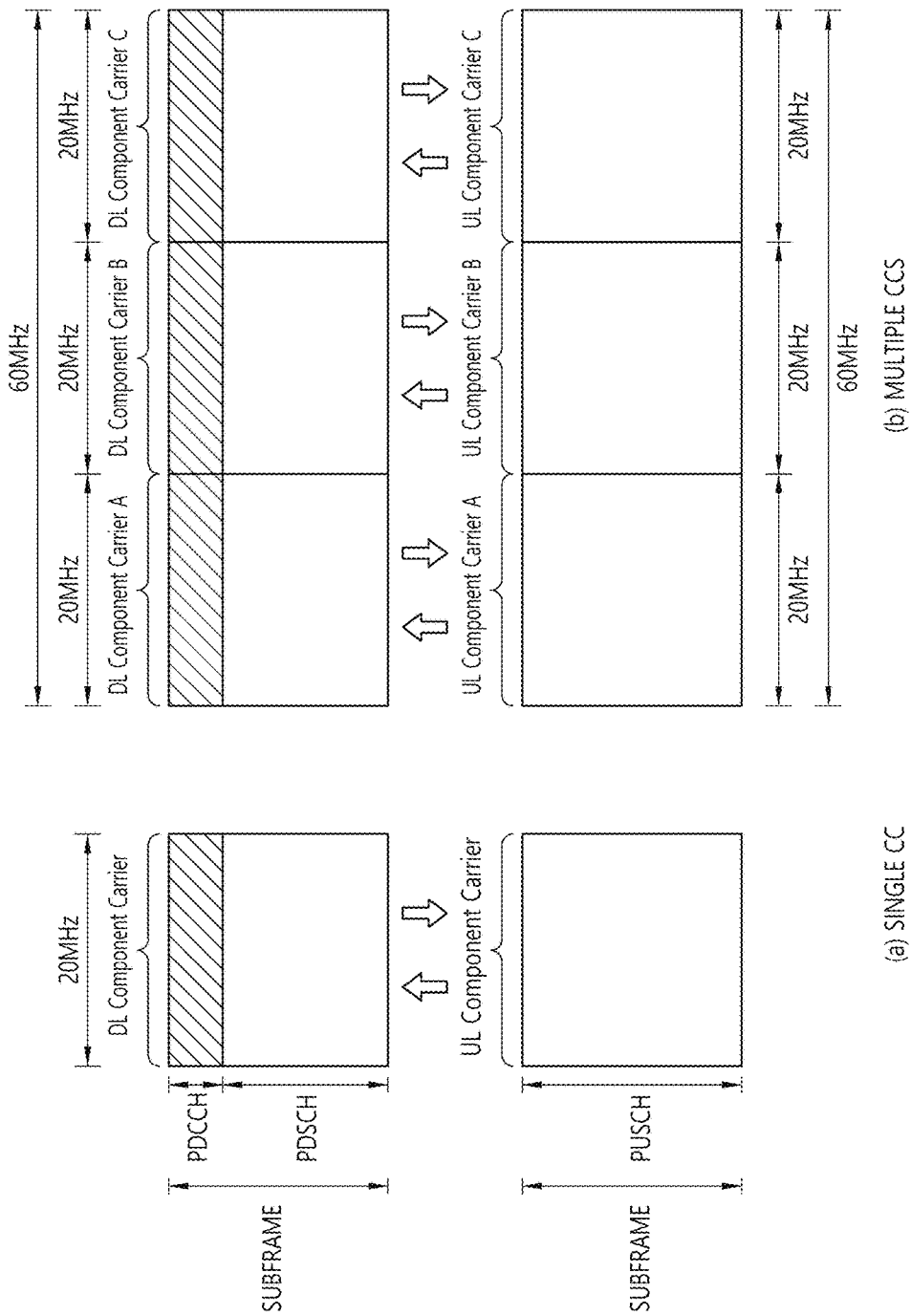
FIG. 6 illustrates an example of comparison between a single carrier system and a carrier aggregation system.

FIG. 6 illustrates an example of comparison between a single carrier system and a carrier aggregation system.

Referring to FIG. 6, there may be various carrier bandwidths, and one carrier is assigned to the terminal. On the contrary, in the carrier aggregation (CA) system, a plurality of component carriers (DL CC A to C, UL CC A to C) may be assigned to the terminal. Component carrier (CC) means the carrier used in then carrier aggregation system and may be briefly referred as carrier. For example, three 20 MHz component carriers may be assigned so as to allocate a 60 MHz bandwidth to the terminal.

Carrier aggregation systems may be classified into a contiguous carrier aggregation system in which aggregated carriers are contiguous and a non-contiguous carrier aggregation system in which aggregated carriers are spaced apart from each other. Hereinafter, when simply referring to a carrier aggregation system, it should be understood as including both the case where the component carrier is contiguous and the case where the control channel is non-contiguous.

When one or more component carriers are aggregated, the component carriers may use the bandwidth adopted in the existing system for backward compatibility with the existing system. For example, the 3GPP LTE system supports bandwidths of 1.4 MHz, 3 MHz, 5 MHz, 10 MHz, 15 MHz and 20 MHz, and the 3GPP LTE-A system may configure a broad band of 20 MHz or more only using the bandwidths of the 3GPP LTE system. Or, rather than using the bandwidths of the existing system, new bandwidths may be defined to configure a wide band.

The system frequency band of a wireless communication system is separated into a plurality of carrier frequencies. Here, the carrier frequency means the cell frequency of a cell. Hereinafter, the cell may mean a downlink frequency resource and an uplink frequency resource. Or, the cell may refer to a combination of a downlink frequency resource and an optional uplink frequency resource. Further, in the general case where carrier aggregation (CA) is not in consideration, one cell may always have a pair of an uplink frequency resource and a downlink frequency resource.

In order for packet data to be transmitted/received through a specific cell, the terminal should first complete a configuration on the specific cell. Here, the configuration means that reception of system information necessary for data transmission/reception on a cell is complete. For example, the configuration may include an overall process of receiving common physical layer parameters or MAC (media access control) layers necessary for data transmission and reception or parameters necessary for a specific operation in the RRC layer. A configuration-complete cell is in the state where, once when receiving information indicating packet data may be transmitted, packet transmission and reception may be immediately possible.

The cell that is in the configuration complete state may be left in an activation or deactivation state. Here, the "activation" means that data transmission or reception is being conducted or is in ready state. The terminal may monitor or receive a control channel (PDCCH) and a data channel (PDSCH) of the activated cell in order to identify resources (possibly frequency or time) assigned thereto.

The "deactivation" means that transmission or reception of traffic data is impossible while measurement or transmission/reception of minimal information is possible. The terminal may receive system information (SI) necessary for receiving packets from the deactivated cell. In contrast, the terminal does not monitor or receive a control channel (PDCCH) and data channel (PDSCH) of the deactivated cell in order to identify resources (probably frequency or time) assigned thereto.

Cells may be classified into primary cells and secondary cells, serving cells.

The primary cell means a cell operating at a primary frequency. The primary cell is a cell where the terminal conducts an initial connection establishment procedure or connection re-establishment procedure with the base station or is a cell designated as a primary cell during the course of handover.

The secondary cell means a cell operating at a secondary frequency. The secondary cell is configured once an RRC connection is established and is used to provide an additional radio resource.

The serving cell is configured as a primary cell in case no carrier aggregation is configured or when the terminal cannot offer carrier aggregation. In case carrier aggregation is configured, the term "serving cell" denotes a cell configured to the terminal and a plurality of serving cells may be included. One serving cell may consist of one downlink component carrier or a pair of {downlink component carrier, uplink component carrier}. A plurality of serving cells may consist of a primary cell and one or more of all the secondary cells.

The PCC (primary component carrier) means a component carrier (CC) corresponding to the primary cell. The PCC is, among several CCs, the one where the terminal initially achieves connection or RRC connection with the base station. The PCC is a special CC that is in charge of connection or RRC connection for signaling regarding multiple CCs and manages terminal context information (UE context) that is connection information related with the terminal. Further, the PCC achieves connection with the terminal, so that the PCC is always left in the activation state when in RRC connected mode. The downlink component carrier corresponding to the primary cell is denoted downlink primary component carrier (DL PCC) and the uplink component carrier corresponding to the primary cell is denoted uplink primary component carrier (UL PCC).

The SCC (secondary component carrier) means a CC corresponding to a secondary cell. That is, the SCC is a CC other than the PCC, which is assigned to the terminal and is an extended carrier for the terminal to perform additional resource allocation in addition to the PCC. The SCC may be left in activation state or deactivation state. The downlink component carrier corresponding to the secondary cell is denoted downlink secondary component carrier (DL SCC) and the uplink component carrier corresponding to the secondary cell is denoted uplink secondary component carrier (UL SCC).

The primary cell and the secondary cell have the following characteristics.

First, the primary cell is used for transmitting a PUCCH. Second, the primary cell is always left activated while the secondary cell may be activated/deactivated depending on a specific condition. Third, when the primary cell experiences a radio link failure (hereinafter, 'RLF'), RRC re-connection is triggered. Fourth, the primary cell may be varied by a handover procedure that comes with an RACH (random access channel) procedure or by altering a security key. Fifth, NAS (non-access stratum) information is received through the primary cell. Sixth, in the FDD system, the primary cell has always a pair of a DL PCC and a UL PCC. Seventh, a different component carrier (CC) may be set as a primary cell in each terminal. Eighth, the primary cell may be replaced only through a handover or cell selection/cell re-selection procedure. In adding a new serving cell, RRC signaling may be used to transmit system information of a dedicated serving cell.

When configuring a serving cell, a downlink component carrier may form one serving cell or a downlink component carrier and an uplink component carrier form a connection to thereby configure one serving cell. However, a serving cell is not configured with one uplink component carrier alone.

Activation/deactivation of a component carrier is equivalent in concept to activation/deactivation of a serving cell. For example, assuming that serving cell 1 is constituted of DL CC1, activation of serving cell 1 means activation of DL CC1. If serving cell2 is configured by connection of DL CC2 and UL CC2, activation of serving cell2 means activation of DL CC2 and UL CC2. In this sense, each component carrier may correspond to a serving cell.

The number of component carriers aggregated between uplink and downlink may vary. When the number of downlink CCs is the same as the number of uplink CCs is denoted symmetric aggregation, and when the numbers differ from each other is denoted asymmetric aggregation. Further, the sizes (i.e., bandwidth) of CCs may be different from each other. For example, when five CCs are used to configure a 70 MHz band, the configuration may be made as follows: 5 MHz CC(carrier #0)+20 MHz CC(carrier #1)+20 MHz CC(carrier #2)+20 MHz CC(carrier #3)+5 MHz CC(carrier #4).

As described above, the carrier aggregation system, unlike the single carrier system, may support a plurality of component carriers (CCs), i.e., a plurality of serving cells.

Such carrier aggregation system may support cross-carrier scheduling. The cross-carrier scheduling is a scheduling scheme that may conduct resource allocation of a PUSCH transmitted through other component carriers than the component carrier basically linked to a specific component carrier and/or resource allocation of a PDSCH transmitted through other component carriers through a PDCCH transmitted through the specific component carrier. In other words, the PDCCH and the PDSCH may be transmitted through different downlink CCs, and the PUSCH may be transmitted through an uplink CC other than the uplink CC linked to the downlink CC where the PDCCH including a UL grant is transmitted. As such, the system supporting cross-carrier scheduling needs a carrier indicator indicating a DL CC/UL CC through which a PDSCH/PUSCH is transmitted where the PDCCH offers control information. The field including such carrier indicator is hereinafter denoted carrier indication field (CIF).

The carrier aggregation system supporting cross-carrier scheduling may contain a carrier indication field (CIF) in the conventional downlink control information (DCI) format. In the cross-carrier scheduling-supportive carrier aggregation system, for example, an LTE-A system, may have 3 bits expanded due to addition of the CIF to the existing DCI format (i.e., the DCI format used in the LTE system), and the PDCCH architecture may reuse the existing coding method or resource allocation method (i.e., CCE-based resource mapping).

Figure 7:
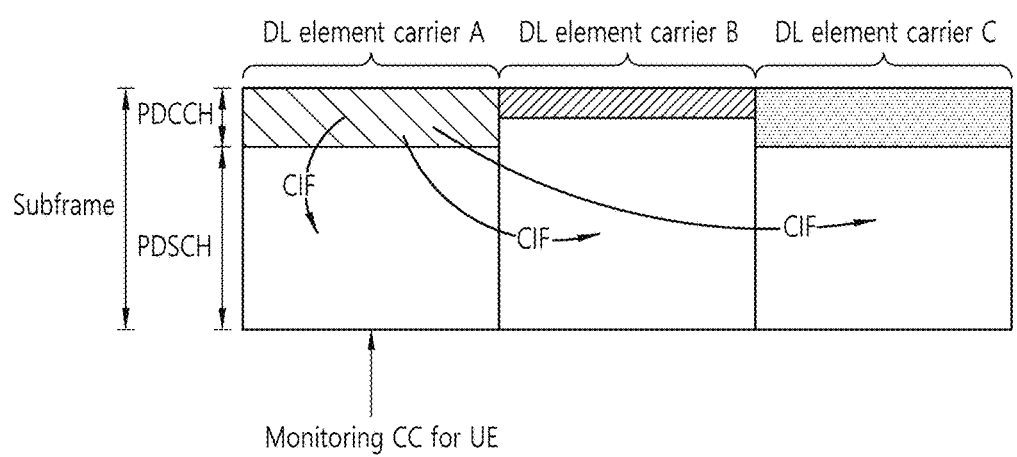
FIG. 7 illustrates an example of cross-carrier scheduling in a carrier aggregation system.

FIG. 7 illustrates an example of cross-carrier scheduling in a carrier aggregation system.

Referring to FIG. 7, the base station may configure a PDCCH monitoring DL CC (monitoring CC) set. The PDCCH monitoring DL CC set consists of some of all the aggregated DL CCs. If cross-carrier scheduling is configured, the terminal conducts PDCCH monitoring/decoding only on the DL CCs included in the PDCCH monitoring DL CC set. In other words, the base station transmits a PDCCH for PDSCH/PUSCH to be scheduled only through the DL CCs included in the PDCCH monitoring DL CC set. The PDCCH monitoring DL CC set may be configured terminal-specifically, terminal group-specifically, or cell-specifically.

In FIG. 7, three DL CCs (DL CC A, DL CC B, and DL CC C) are aggregated, and by way of example, DL CC A is set as the PDCCH monitoring DL CC set. The terminal may receive a DL grant for the PDSCH of DL CC A, DL CC B, and DL CC C through the PDCCH of DL CC A. The DCI transmitted through the PDCCH of DL CC A includes a CIF which allows it to be known which DL CC the DCI is for.

The CIF value is the same as the serving cell index value. The serving cell index is transmitted to the UE through an RRC signal. The serving cell index includes a value for identifying a serving cell, i.e., a first cell (primary cell) or a second cell (secondary cell). For example, 0 may represent a first cell (primary cell).

Figure 8:
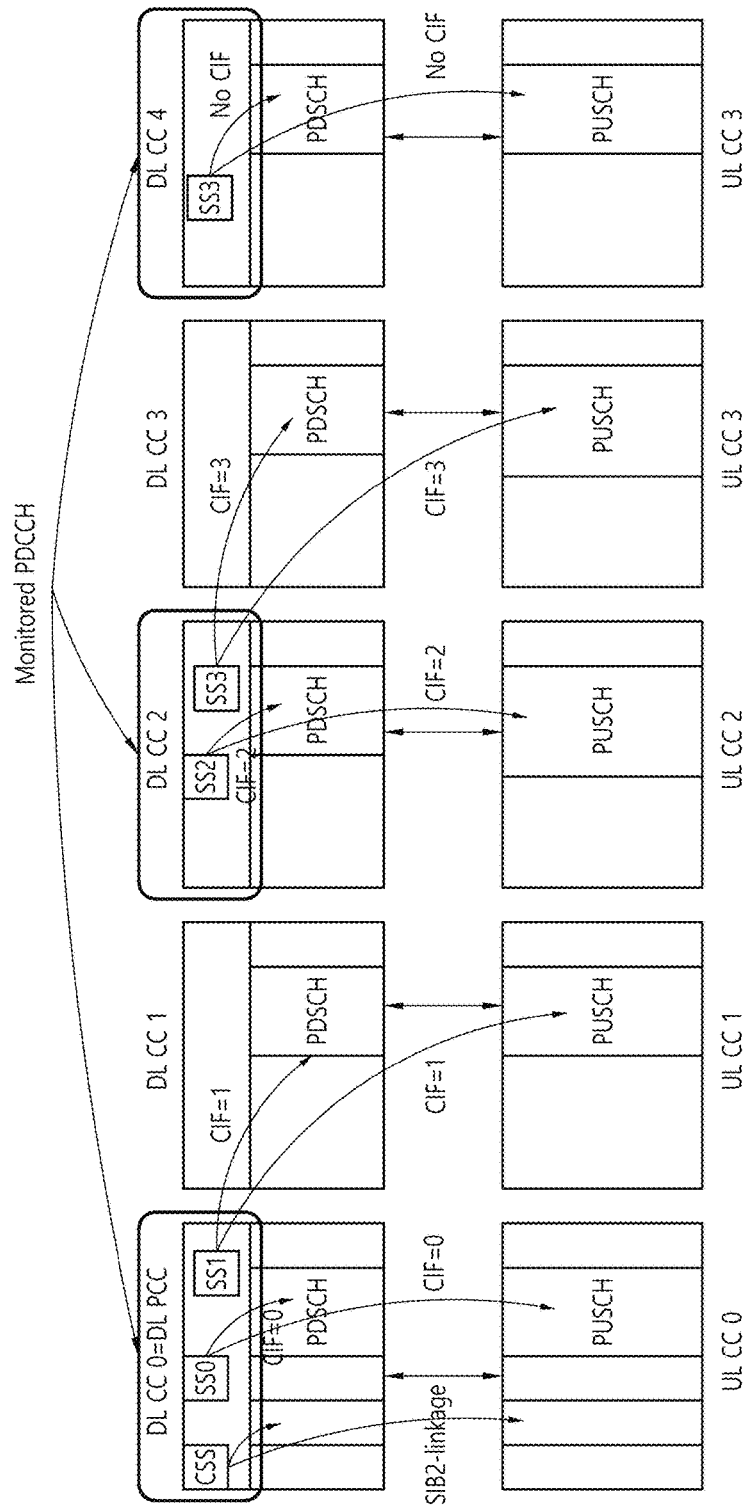
FIG. 8 illustrates an example scheduling when cross-carrier scheduling is configured in a carrier aggregation system.

FIG. 8 illustrates example scheduling when cross-carrier scheduling is configured in a carrier aggregation system.

Referring to FIG. 8, DL CC 0, DL CC 2, and DL CC 4 are a PDCCH monitoring DL CC set. The terminal searches a DL grant/UL grant for DL CC 0, UL CC 0 (UL CC linked via SIB2 with DL CC 0) in the CSS of DL CC 0. In SS 1 of DL CC 0, a DL grant/UL grant for DL CC 1, UL CC 1 is searched. SS 1 is an example of the USS. That is, SS 1 of DL CC 0 is a search space for searching a DL grant/UL grant performing cross-carrier scheduling.

Meanwhile, the carrier aggregation (CA) technologies, as described above, may be generally separated into an inter-band CA technology and an intra-band CA technology. The inter-band CA is a method that aggregates and uses CCs that are present in different bands from each other, and the intra-band CA is a method that aggregates and uses CCs in the same frequency band. Further, CA technologies are more specifically split into intra-band contiguous CA, intra-band non-contiguous CA, and inter-band non-contiguous CA.

FIG. 9 is a concept view illustrating intra-band carrier aggregation (CA).

FIG. 9a illustrates intra-band contiguous CA, and FIG. 9b illustrates intra-band non-contiguous CA.

LTE-advanced adds various schemes including uplink MIMO and carrier aggregation in order to realize high-speed wireless transmission. The CA may be split into the intra-band contiguous CA shown in FIG. 11a and the intra-band non-contiguous CA shown in FIG. 11b.

Figure 10:
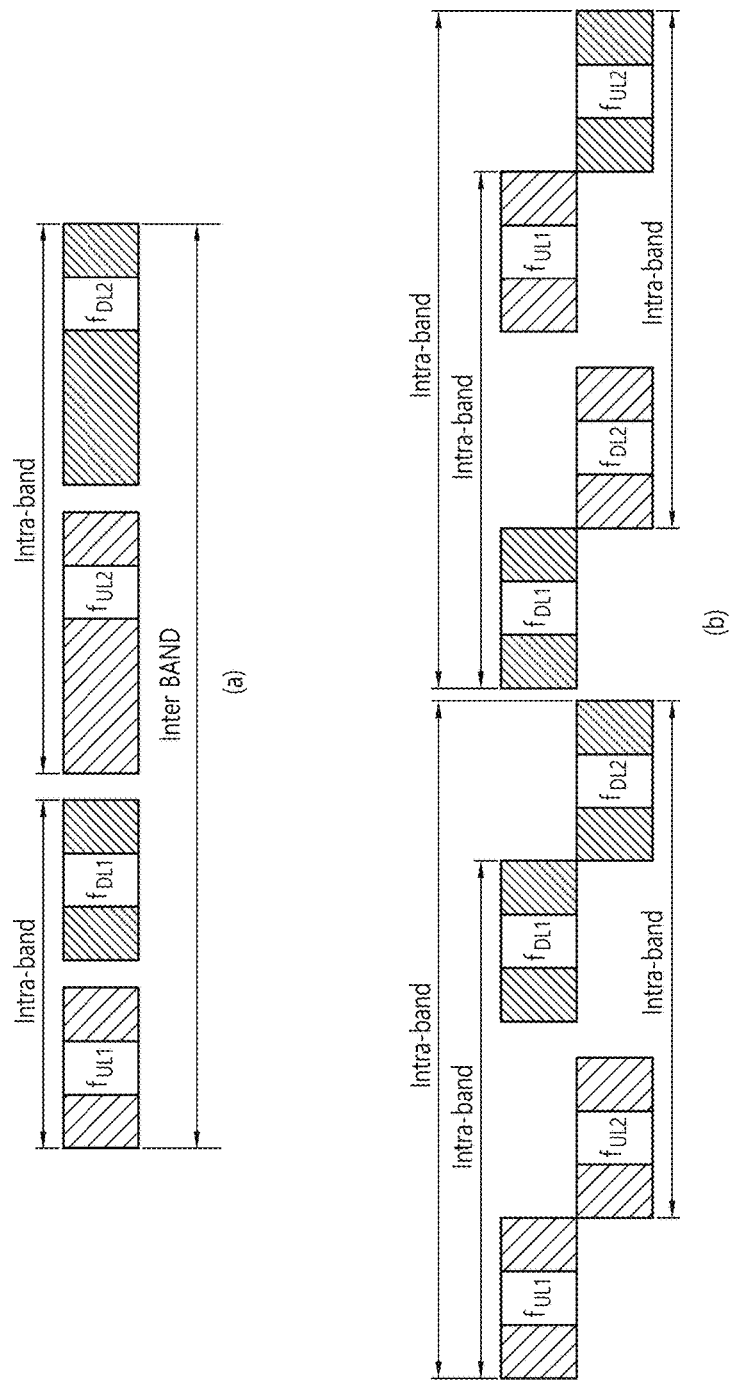
FIG. 10 is a concept view illustrating inter-band carrier aggregation.

FIG. 10 is a concept view illustrating inter-band carrier aggregation.

FIG. 10a illustrates a combination of a lower band and a higher band for inter-band CA, and FIG. 10b illustrates a combination of similar frequency bands for inter-band CA.

In other words, the inter-band carrier aggregation may be separated into inter-band CA between carriers of a low band and a high band having different RF characteristics of inter-band CA as shown in FIG. 12a and inter-band CA of similar frequencies that may use a common RF terminal per component carrier due to similar RF (radio frequency) characteristics as shown in FIG. 12b.

TABLE 1

| Operating Band | Uplink (UL) operating band $F_{UL\_low} - F_{UL\_high}$ | Downlink (DL) operating band $F_{DL\_low} - F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 61 | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23 | 2000 MHz-2020 MHz | 2180 MHz-2200 MHz | FDD |
| 24 | 1626.5 MHz-1660.5 MHz | 1525 MHz-1559 MHz | FDD |
| 25 | 1850 MHz-1915 MHz | 1930 MHz-1995 MHz | FDD |
| 26 | 814 MHz-849 MHz | 859 MHz-894 MHz | FDD |
| 27 | 807 MHz-824 MHz | 852 MHz-869 MHz | FDD |
| 28 | 703 MHz-748 MHz | 758 MHz-803 MHz | FDD |
| 29 | N/A N/A | 717 MHz-728 MHz | FDD |
| 30 | 2305 MHz-2315 MHz | 2350 MHz-2360 MHz | FDD |
| 31 | 452.5 MHz-457.5 MHz | 462.5 MHz-467.5 MHz | FDD |
| 32 | N/A N/A | 1452 MHz-1496 MHz | FDD |
| 64 | Reserved | Reserved | FDD |
| 65 | 1920 MHz-2010 MHz | 2110 MHz-2200 MHz | FDD |
| 66 | 1710 MHz-1780 MHz | 2110 MHz-2200 MHz | FDD |
| 67 | N/A N/A | 738 MHz-758 MHz | FDD |
| ... | | | |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz-2690 MHz | 2496 MHz-2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |
| 44 | 703 MHz-803 MHz | 703 MHz-803 MHz | TDD |
| 45 | 1447 MHz-1467 MHz | 1447 MHz-1467 MHz | TDD |
| 46 | 5150 MHz-5925 MHz | 5150 MHz-5725 MHz | TDD |

Meanwhile, the 3GPP LTE/LTE-A systems define operating bands for uplink and downlink as shown in Table 1 above. Four CA cases shown in FIG. 6 and FIG. 7 come from Table 1.

Here, $F_{UL\_low}$ means the lowest frequency in the uplink operating bands. $F_{UL\_high}$ means the highest frequency in the uplink operating bands. Further, $F_{DL\_low}$ means the lowest frequency in the downlink operating bands, and $F_{DL\_high}$ means the highest frequency in the downlink operating bands.

When the operating bands are defined as shown in Table 1, each nation's frequency distributing organization may assign specific frequencies to service providers in compliance with the nation's circumstances.

Meanwhile, CA bandwidth classes and their corresponding guard bands are as shown in the following table.

TABLE 2

| CA Bandwidth Class | Aggregated Transmission Bandwidth Configuration | Maximum number of CCs | Nominal Guard Band BWGB |
|---|---|---|---|
| A | $N_{RB,agg} \leq 100$ | 1 | $a1BW_{Channel(1)} - 0.5\Delta f1$ (NOTE2) |
| B | $N_{RB,agg} \leq 100$ | 2 | $0.05 \max(BW_{Channel(1)}, BW_{Channel(2)}) - 0.5\Delta f1$ |
| C | $100 < N_{RB,agg} \leq 200$ | 2 | $0.05 \max(BW_{Channel(1)}, BW_{Channel(2)}) - 0.5\Delta f1$ |
| D | $200 < N_{RB,agg} \leq [300]$ | 3 | $0.05 \max(BW_{Channel(1)}, BW_{Channel(2)}) - 0.5\Delta f1$ |
| E | $[300] < N_{RB,agg} \leq [400]$ | 4 | $0.05 \max(BW_{Channel(1)}, BW_{Channel(2)}, BW_{Channel(3)}, BW_{Channel(4)}) - 0.5\Delta f_1$ |

TABLE 2-continued

| CA Bandwidth Class | Aggregated Transmission Bandwidth Configuration | Maximum number of CCs | Nominal Guard Band BWGB |
|---|---|---|---|
| F | [400] < $N_{RB,agg}$ ≤ [500] | 5 | FFS |
| I | 700 < $N_{RB,agg}$ ≤ 800 | 8 | FFS |

NOTE 1:
$BW_{Channel(j)}$, j = 1, 2, 3, 4 is the channel bandwidth of an E-UTRA component carrier according to Table 5.6-1 and $\Delta f_1 = \Delta f$ for the downlink with $\Delta f$ the subcarrier spacing while $\Delta f_1 = 0$ for the uplink.
NOTE 2:
$a_1 = 0.16/1.4$ for $BW_{Channel(1)} = 1.4$ MHz whereas $a_1 = 0.05$ for all other channel bandwidths.

In the above table, FFS stands for 'For Further Study.' $N_{RB\_gg}$ is the number of RBs aggregated in an aggregation channel band.

The table below shows the set of Bandwidths corresponding to each CA Configuration.

TABLE 3

E-UTRA CA configuration/Bandwidth combination set

| E-UTRA CA configuration | The channel frequency bandwidth allowed by each carrier | The channel frequency bandwidth allowed by each carrier | The channel frequency bandwidth allowed by each carrier | Maximum aggregated bandwidth) [MHz] | Bandwidth Combination Set) |
|---|---|---|---|---|---|
| CA_1C | 15 | 15 | | 40 | 0 |
| | 20 | 20 | | | |
| CA_3C | 5, 10, 15 | 20 | | 40 | 0 |
| | 20 | 5, 10, 15, 20 | | | |
| CA_7C | 15 | 15 | | 40 | 0 |
| | 20 | 20 | | | |
| | 10 | 20 | | 40 | 1 |
| | 15 | 15, 20 | | | |
| | 20 | 10, 15, 20 | | | |
| CA_23B | 10 | 10 | | 20 | 0 |
| | 5 | 15 | | | |
| CA_27B | 1.4, 3, 5 | 5 | | 13 | 0 |
| | 1.4, 3 | 10 | | | |
| CA_38C | 15 | 15 | | 40 | 0 |
| | 20 | 20 | | | |
| CA_39C | 5, 10, 15 | 20 | | 35 | 0 |
| | 20 | 5, 10, 15 | | | |
| CA_40C | 10 | 20 | | 40 | 0 |
| | 15 | 15 | | | |
| | 20 | 10, 20 | | | |
| CA_41C | 10 | 20 | | 40 | 0 |
| | 15 | 15, 20 | | | |
| | 20 | 10, 15, 20 | | | |
| | 5, 10 | 20 | | 40 | 1 |
| | 15 | 15, 20 | | | |
| | 20 | 5, 10, 15, 20 | | | |
| CA_40D | 10, 20 | 20 | 20 | 60 | 0 |
| | 20 | 10 | 20 | | |
| | 20 | 20 | 10 | | |
| CA_41D | 10 | 20 | 15 | 60 | 0 |
| | 10 | 15, 20 | 20 | | |
| | 15 | 20 | 10, 15 | | |
| | 15 | 10, 15, 20 | 20 | | |
| | 20 | 15, 20 | 10 | | |
| | 20 | 10, 15, 20 | 15, 20 | | |
| CA_42C | 5, 10, 15, 20 | 20 | 5, 10, 15, 20 | 40 | 0 |
| | 20 | 5, 10, 15 | 20 | | |

In the above table, the CA configuration represents the operating band and the CA bandwidth class. For example, CA_1C refers to operating band 2 in Table 2 and CA band class C in Table 3. For all bands not shown in the table above, all CA action classes can be applied.

Figure 11:
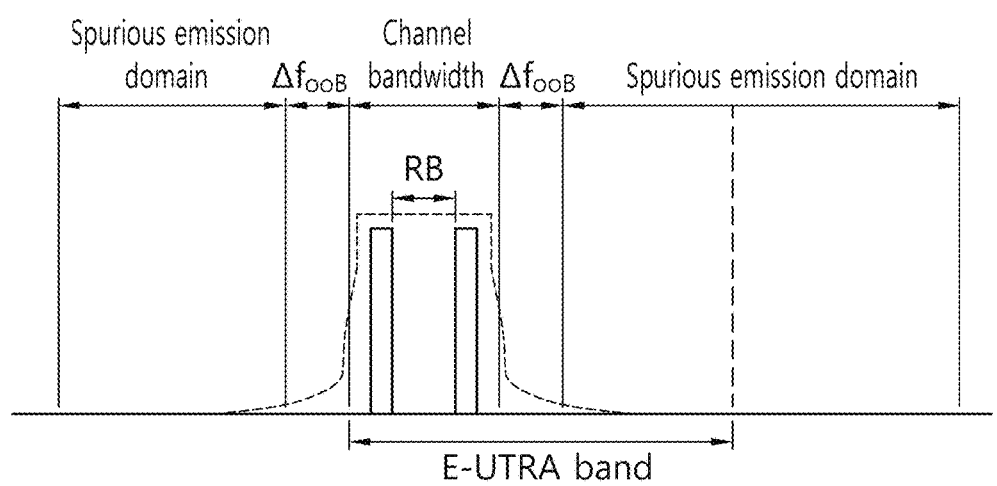
FIG. 11 schematically shows a concept of a wanted signal for minimizing influence on a neighboring channel caused by a filter when performing transmission and an unwanted emission for bands excluding the wanted transmission band.
Figure 12:
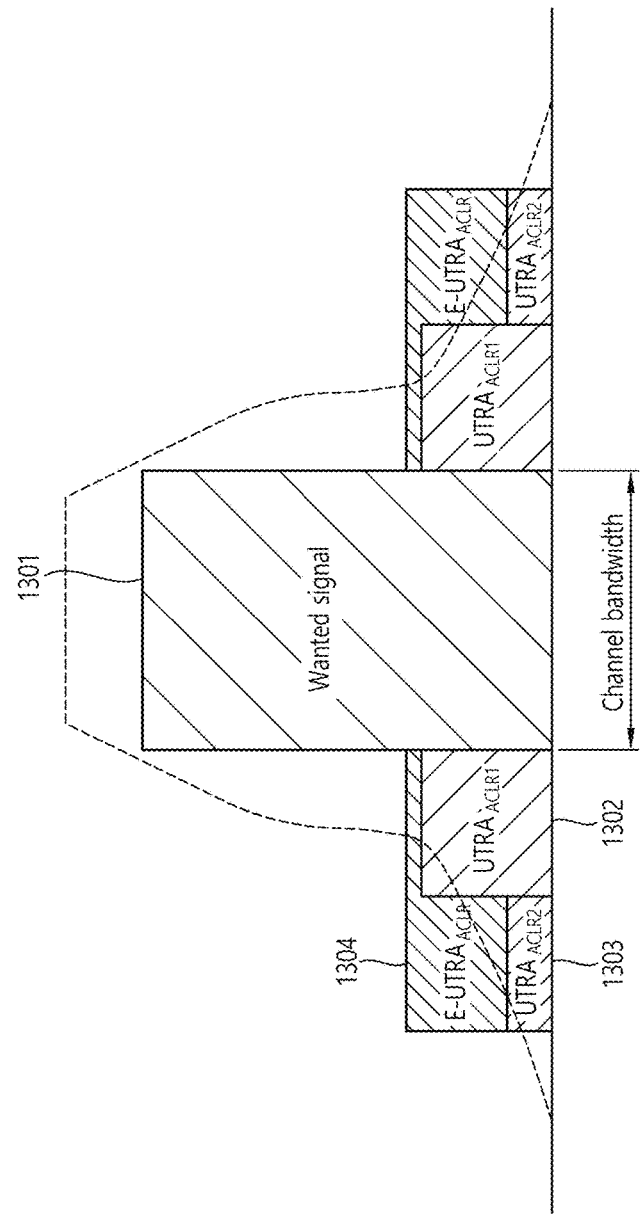
FIG. 12 shows an Out-of-band (OOB) unwanted emission standard among the unwanted emissions shown in FIG. 11.

FIG. 11 schematically shows a concept of a wanted signal for minimizing influence on a neighboring channel caused by a filter when performing transmission and an unwanted emission for bands excluding the wanted transmission band. FIG. 12 shows an Out-of-band (OOB) unwanted emission standard among the unwanted emissions shown in FIG. 11. And, FIG. 13 shows a relationship between the channel band (MHz) and the resource block (RB) shown in FIG. 11.

As shown in FIG. 11, it is apparent that a random transmission modem transmits a signal over a channel bandwidth, which is allocated within a random E-UTRA band.

Figure 13:
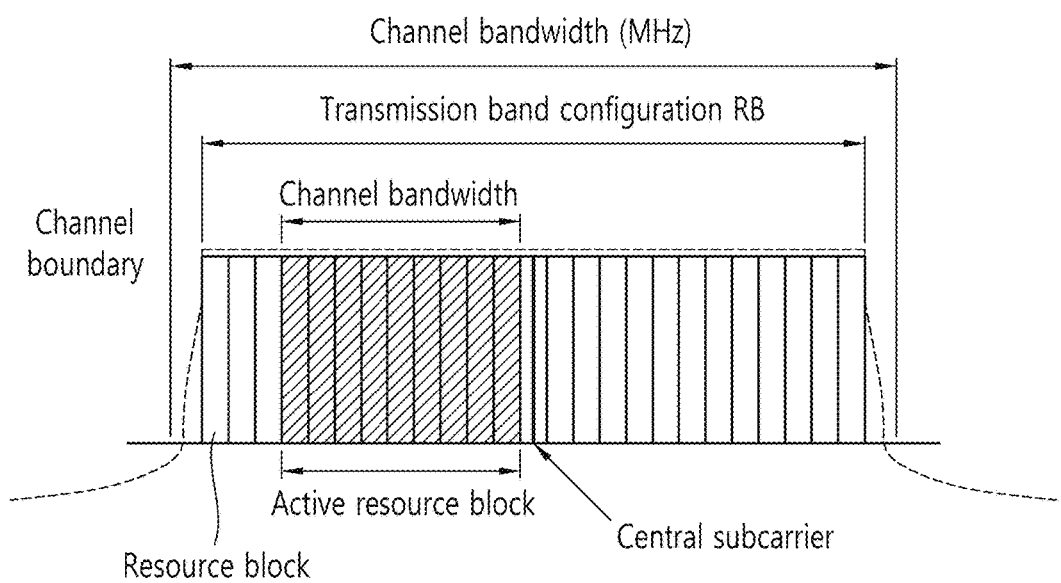
FIG. 13 shows a relationship between the channel band (MHz) and the resource block (RB) shown in FIG. 11.

Herein, a channel bandwidth is defined as shown in FIG. 13. More specifically, a transmission bandwidth configuration is set up to be smaller than the channel bandwidth ($BW_{channel}$). The transmission bandwidth configuration is set up by a plurality of resource blocks (RBs). And, outer edges of the channel correspond to a highest frequency and a lowest frequency that are divided by the channel bandwidth.

Meanwhile, as described above, in a 3GPP LTE system, 1.4 MHz, 3 MHz, 5 MHz, 10 MHz, 15 MHz, and 20 MHz are supported as channel bandwidth. The relationship between such channel bandwidths and the number of resource blocks is shown below in the following table.

TABLE 4

| | Channel bandwidth $BW_{Channel}$ [MHz] | | | | | |
|---|---|---|---|---|---|---|
| | 1.4 | 3 | 5 | 10 | 15 | 20 |
| Channel bandwidth configuration NRB | 6 | 15 | 25 | 50 | 75 | 100 |

Referring back to FIG. 11, an unwanted emission occurs in a band of $\Delta f_{OOB}$, and, as shown in the drawing, an unwanted emission also occurs within a spurious region. Herein, $\Delta f_{OOB}$ indicates a size of an Out of Band (OOB) frequency, which is shown below in the following table.

TABLE 5

| | Channel bandwidth | | | | | |
|---|---|---|---|---|---|---|
| | 1.4 MHz | 3.0 MHz | 5 MHz | 10 MHz | 15 MHz | 20 MHz |
| Out of band boundary $F_{OOB}$ (MHz) | 2.8 | 6 | 10 | 15 | 20 | 25 |

Meanwhile, an out-of-band emission refers to an emission occurring in a band neighboring an intended transmission band. A spurious emission refers to unnecessary waves being emitted from a frequency domain that is located further away from the intended transmission band than the out-of-band domain.

Meanwhile, 3GPP Release 8 defines a basic spurious emission (SE) corresponding to a minimum limit that should not be exceeded, when an LTE UE performs transmission, in accordance with the corresponding frequency range, and Release 10 additionally defines an SE standard that is applied when an LTE-A UE supporting CA performs transmission.

Meanwhile, as shown in FIG. 12, when transmission is performed in an E-UTRA channel band 1301, a leak, i.e., unwanted emission, occurs out-of-band (1302, 1303, and 1304 within the $f_{OOB}$ domain shown in the drawing).

Herein, as shown in the drawing, when the user equipment performs transmission from an E-UTRA channel 1301, and in case an immediately adjacent (or neighboring) channel 1302 is required to protect the UTRA UE, $UTRA_{ACLR1}$ represents a limited standard for a leakage ratio, i.e., an adjacent channel leakage ratio, to the neighboring channel 1302, i.e., UTRA channel 1. Additionally, in case a channel 1303 allocated next to the adjacent (or neighboring) channel 1302 is required to protect the UTRA UE, $UTRA_{ACLR2}$ represents a limited standard for a leakage ratio, i.e., an adjacent channel leakage ratio, to the neighboring channel 1303, i.e., UTRA channel. And, when a user equipment performs transmission from an E-UTRA channel 1301, $E-UTRA_{ACLR}$ represents a limited standard for a leakage ratio, i.e., an adjacent channel leakage ratio, to a neighboring channel 1304 that corresponds to the same channel as the channel bandwidth of an E-UTRA in an immediately adjacent (or neighboring) frequency domain.

As described above, when transmission is performed from an allocated channel band, unwanted emission may occur to neighboring (or adjacent) channels.

As described above, due to the wireless transmission, unwanted emission may occur to bands that are adjacent to one another. At this point, the amount of interference, which is caused by the emission according to the transmission of the base station, and which is led into an adjacent (or neighboring) band, may be reduced to an approved reference standard or below by adding an RF filter that is designed to have a large size at a high cost due to the characteristics of the base station. Conversely, in case of a user equipment, due to the limited size of a user equipment, the limited price range of a power amplifier or a pre-duplex RF filter device, and so on, it is difficult to prevent unwanted emission to be led into an adjacent band.

Therefore, limiting the transmission power of the user equipment is necessary.

In an LTE system, a maximum power (Pcmax) that can actually be used by the user equipment may be simply expressed as presented below.

$$P\text{cmax} = \text{Min}(P\text{emax}, P\text{umax}) \qquad \text{[Equation 1]}$$

Herein, Pcmax indicates to a maximum power (actual maximum transmission power) that can be transmitted by the user equipment from its corresponding cell, and Pemax indicates to a maximum power than can be used within a corresponding cell to which the base station performs signaling. Also, Pumax refers to power that considers a Maximum Power Reduction (hereinafter referred to as MPR), an additional-MPR (hereinafter referred to as A-MPR), and so on, in the maximum power ($P_{PowerClass}$) of the user equipment itself.

A maximum power ($P_{PowerClass}$) of the user equipment itself is as shown below in the following table.

TABLE 6

| Operating band | Power class 1 (dBm) | Power class 3 (dBm) |
|---|---|---|
| 1, 2, 3, 4, 5, 6, 7, 8, 9, 10, 11, 12, 13, 14, 17, 18, 18, 19, 20, 21, 22, 23, 24, 25, 26, 27, 28, 30, 31, 32, 33, 34, 35, 36, 37, 38, 39, 40, 41, 42, 43, 44, 45, 46 | | 23dBm |
| 14 | 31 dBm | |

Meanwhile, in case of an Intra Band-Contiguous CA, the maximum power ($P_{PowerClass}$) of the user equipment itself is as shown below in the following table.

TABLE 7

| Operating band | Power class 3 (dBm) |
|---|---|
| CA_1C | 23dBm |
| CA_3C | 23dBm |
| CA_7C | 23dBm |
| CA_8B | 23dBm |
| CA_38C | 23dBm |
| CA_39C | 23dBm |
| CA_40C | 23dBm |
| CA_41C | 23dBm |
| CA_42C | 23dBm |

FIG. 14 is an exemplary diagram showing a method for limiting the transmission power of a user equipment.

As shown in (a) of FIG. 14, the user equipment (UE) 100 performs transmission by limiting its transmission power.

In case a peak-to-average power ratio (PAPR) is high, linearity of the power amplifier (PA) may be reduced. And, in order to maintain such linearity, a maximum power reduction (MPR) value, which is used for limiting the transmission power, may be applied to have a maximum value of 3 dB in accordance with the modulation scheme. This is as shown below in the following table.

TABLE 8

| | Channel bandwidth/Transmission bandwidth (NRB) | | | | | | |
|---|---|---|---|---|---|---|---|
| Modulation | 1.4 MHz | 3.0 MHz | 5 MHz | 10 MHz | 15 MHz | 20 MHz | MPR (dB) |
| QPSK | >5 | >4 | >8 | >12 | >16 | >18 | ≤1 |
| 16 QAM | ≤5 | ≤4 | ≤8 | ≤12 | ≤16 | ≤18 | ≤1 |
| 16 QAM | >5 | >4 | >8 | >12 | >16 | >18 | ≤2 |
| 64 QAM | ≤5 | ≤4 | ≤8 | ≤12 | ≤16 | ≤18 | ≤2 |
| 64 QAM | >5 | >4 | >8 | >12 | >16 | >18 | ≤3 |

Table 8, which is presented above, indicates values of MPR for Power classes 1 and 3.

<MPR According to 3GPP Release 11>

Meanwhile, according to 3GPP Release 11, the user equipment may adopt a multi-clustered transmission in a single component carrier (CC) and may simultaneously transmit a PUSCH and a PUCCH. As described above, if the PUSCH and the PUCCH are transmitted at the same time, the size of an IM3 component (which refers to a distortion signal that is generated by intermodulation), which occurs in an out-of-band domain, may become larger as compared to its initial (or conventional) size with the existing size. And, this may act as a larger interference to an adjacent (or neighboring) band. Accordingly, the MPR value may be configured as presented below in order to satisfy the emission requirements of a user equipment, which are to be achieved by any user equipment performing uplink transmission, wherein the emission requirement includes a general spurious emission, an adjacent channel leakage ratio (ACLR), and a general spectrum emission mask (SEM).

$$MPR = CEIL\{M_A, 0.5\} \quad \text{[Equation 2]}$$

Herein, $M_A$ is as described below.

$M_A = [8.0] - [10.12]A; \ 0 < A \leq [0.33]$ $[5.67] - [3.07]A; \ [0.33] < A \leq [0.77]$ $[3.31]; \ [0.77] < A \leq [1.0]$ Herein, A is as described below.

$A = N_{RB_{alloc}} / N_{RB}.$ $N_{RB\_agg}$ indicates a number of RBs existing within a channel band, and $N_{RB\_alloc}$ indicates a total number of RBs that are transmitted simultaneously.

$CEIL\{M_A, 0.5\}$ indicates a function that is rounded in units of 0.5 db. More specifically, $MPR \in [3.0, 3.5\ 4.0\ 4.5\ 5.0\ 5.5\ 6.0\ 6.5\ 7.0\ 7.5\ 8.0]$.

The MPR values shown in Equation 2, which is presented above, correspond to the MPR values that are applied when a general power amplifier (PA) is used. In case of using a high efficiency power amplifier (HEPA), which is currently being researched, a higher level of MPR values may be required. However, although the HEPA is advantageous in being capable of reducing power consumption and heat radiation to 30% or more, as the HEPA requires a larger level of MPR value, this results in a disadvantage of reducing cell coverage. Also, up to this day, since the linearity can only to be ensured to a bandwidth of up to 20 MHz, when considering carrier aggregation (CA), there lies a disadvantageous in that the linearity cannot be ensured.

<General MPR>

On the other hand, when considering the CA, a channel bandwidth of an uplink may be increased to a maximum bandwidth of 40 MHz (20 MHz+20 MHz). And, accordingly, higher MPR values are required.

TABLE 9

| | CA bandwidth Class C | | | | |
|---|---|---|---|---|---|
| Modulation | 50 RB + 100 RB | 75 RB + 75 RB | 75 RB + 100 RB | 100 RB + 100 RB | MPR (dB) |
| QPSK | >12 and ≤50 | >16 and ≤75 | >16 and ≤75 | >18 and ≤100 | ≤1 |
| QPSK | >50 | >75 | >75 | >100 | ≤2 |
| 16 QAM | ≤12 | ≤16 | ≤16 | ≤18 | ≤1 |
| 16 QAM | >12 and ≤50 | >16 and ≤75 | >16 and ≤75 | >18 and ≤100 | ≤2 |
| 16 QAM | >50 | >75 | >75 | >100 | ≤3 |

TABLE 9-continued

| | CA bandwidth Class C | | | | |
|---|---|---|---|---|---|
| Modulation | 50 RB + 100 RB | 75 RB + 75 RB | 75 RB + 100 RB | 100 RB + 100 RB | MPR (dB) |
| 64 QAM | ≤8 and allocation wholly contained within a single CC | ≤12 and allocation wholly contained within a single CC | ≤8 and allocation wholly contained within a single CC | ≤12 and allocation wholly contained within a single CC | ≤16 and allocation wholly contained within a single CC |
| 64 QAM | >8 or allocation extends across two CC's | >12 or allocation extends across two CC's | >8 or allocation extends across two CC's | >12 or allocation extends across two CC's | >16 or allocation extends across two CC's |

The table, which is presented above, indicates values of MPR for Power class 3.

As shown in the table, which is presented above, in case of Class C of an intra-contiguous CA, MPR values of a maximum of 3 dB may be applied in accordance with the modulation scheme. Meanwhile, when considering a multi-clustered transmission under a CA Class C environment, the MPR values according to the equation presented below should be satisfied.

$$MPR = CEIL\{M_A, 0.5\} \quad \text{[Equation 3]}$$

Herein, $M_A$ is as described below.

$$M_A = 8.2; \quad 0 \leq A < 0.025$$

$$9.2 - 40A; \quad 0.025 \leq A < 0.05$$

$$8 - 16A; \quad 0.05 \leq A < 0.25$$

$$4.83 - 3.33A; \quad 0.25 \leq A \leq 0.4,$$

$$3.83 - 0.83A; \quad 0.4 \leq A \leq 1,$$

<A-MPR>

As shown in (b) of FIG. 14, it is apparent that the base station may apply an additional maximum power reduction (A-MPR) by transmitting network signals (NS) to the user equipment 100. Unlike the above-described MPR, in order to avoid causing influence on adjacent bands, the A-MPR allows the base station to transmit a network signal (NS) to a user equipment 100, which operates only in a particular operating band, so that the corresponding user equipment 100 can additionally reduce power.

The table shown below indicates A-MPR values according to network signals.

TABLE 10

| Network Signaling value | Channel bandwidth (MHz) | Resources Blocks (NRB) | A-MPR (dB) |
|---|---|---|---|
| NS_1 | 1.4, 3, 5, 10, 15, 20 | | Not decided |
| NS_03 | 3 | >5 | ≤1 |
| | 5 | >6 | ≤1 |
| | 10 | >6 | ≤1 |
| | 15 | >8 | ≤1 |
| | 20 | >10 | ≤1 |
| NS_04 | 5 | >6 | ≤1 |
| NS_05 | 10, 15, 20 | ≥50 | ≤1 |
| NS_06 | 1.4, 3, 5, 10 | — | Not decided |
| NS_07 | 10 | | Shown in Table 9 |
| NS_08 | 10, 15 | >44 | ≤3 |
| NS_09 | 10, 15 | >40 | ≤1 |
| | | >55 | ≤2 |

TABLE 10-continued

| Network Signaling value | Channel bandwidth (MHz) | Resources Blocks (NRB) | A-MPR (dB) |
|---|---|---|---|
| NS_18 | 5 | ≥2 | ≤1 |
| | 10, 15, 20 | ≥1 | ≤4 |

The table shown below indicates A-MPR values when the network signal is NS_07.

TABLE 11

| | Parameter | | |
|---|---|---|---|
| | Region A | Region B | Region C |
| | | RB start | |
| | 0-12 | 13-18 | 19-42 | 43-49 |
| LCRB [RBs] | 6-8 | 1-5, 9-50 | ≥8 | ≥18 | ≤2 |
| A-MPR [dB] | ≤8 | ≤12 | ≤12 | ≤6 | ≤3 |

In the table presented above, $RB_{start}$ indicates a smallest RB index of a transmission RB. And, $L_{CRB}$ indicates a length of a contiguous RB allocation.

For example, in case a user equipment receiving a service by using a 10 MHz channel bandwidth in Band 13 receives NS_07 as a network signal, the user equipment determines a transmission power in accordance with the table presented above and then performs transmission. More specifically, when the user equipment decodes a received uplink grant, and in case the user equipment indicates 5 RBs to be contiguously transmitted from a $10^{th}$ RB as the start position of the RB, the user equipment may perform transmission by applying a maximum of 12 dB as the A-MPR value. Accordingly, the transmission power of the user equipment may be applied by using the following equation for obtaining $P_{cmax}$.

$P_{cmax}$ should satisfy the following conditions.

$$P_{CMAX\_L} \leq P_{CMAX} \leq P_{CMAX\_H} \quad \text{[Equation 4]}$$

Herein, $P_{CMAX\_L}$ may be obtained as described below.

$$P_{CMAX\_L} = MIN\{P_{EMAX} - \Delta T_C, P_{PowerClass} - MAX(MPR + A-MPR, P-MPR) - \Delta T_C\} \quad \text{[Equation 5]}$$

$P_{CMAX\_H}$ may be obtained as described below.

$$P_{CMAX\_H} = MIN\{P_{EMAX}, P_{PowerClass}\} \quad \text{[Equation 6]}$$

$P_{EMAX}$ is given as P-Max through a RRC signal. When considering the tolerated value, $P_{PowerClass}$ indicates a maximum UE power. P-MPR indicates a tolerable reduction of a maximum transmission power. The P-MPR may be obtained by using an equation for obtaining $P_{CMAX}$. $\Delta T_C$ may be equal to 0 dB or 1.5 dB.

Figure 15:
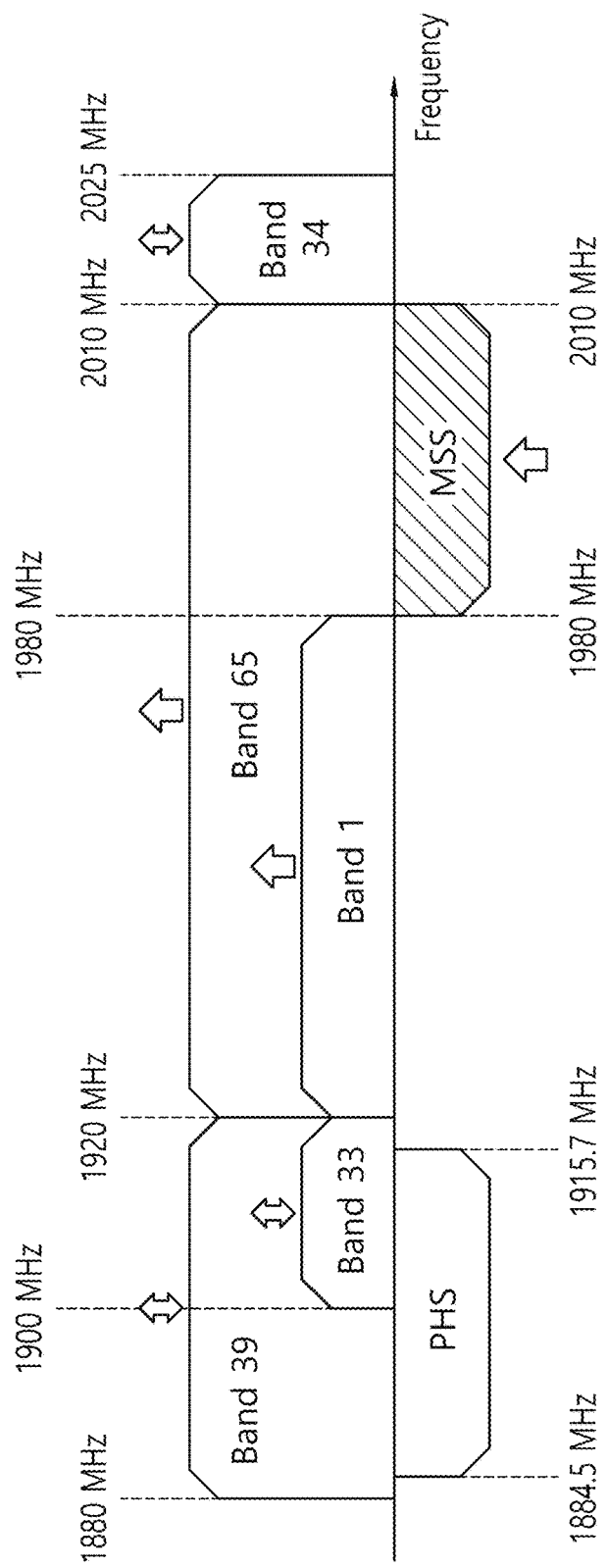
FIG. 15 shows a relationship between a mobile satellite service band and a neighboring band.

FIG. 15 shows a relationship between a mobile satellite service band and a neighboring band.

The mobile satellite service (MSS) provides mobile communication services by using satellite. More specifically, 3GPP approves 1980 MHz-2010 MHz and 2170 MHz-2200 MHz bands as the bands for providing the mobile satellite service (MSS). And, the bands designated for the mobile satellite service (MSS) having usage rates that are not high were capable of performing the function of a guard band for the neighboring bands. However, as the usage rate of the mobile satellite service (MSS) fails to mark a high level, 3GPP approved part of the mobile satellite service (MSS) bands to be used for another purpose.

More specifically, as shown in FIG. 15, among the bands for the mobile satellite service (MSS), an uplink band (i.e., 1980 MHz-2010 MHz) is adjacent to an uplink band of (i.e., 1920 MHz-1980 MHz) Band 1. Among the bands for the mobile satellite service (MSS), an uplink band is adjacent to an uplink/downlink band (i.e., 2010 MHz-2025 MHz) of Band 34. And, among the bands for the mobile satellite service (MSS), an uplink band is adjacent to an uplink band (i.e., 1920 MHz-2010 MHz) of Band 65.

Accordingly, as the bands for the mobile satellite service (MSS) is being used for another purpose, the coexistence of Band 1, Band 34, and Band 65 overlapping with or being adjacent to the band for the mobile satellite service (MSS) need to be ensured.

Meanwhile, the uplink band of Band 1 and the uplink band of Band 65 are adjacent to the uplink/downlink band (i.e., 1900 MHz-1920 MHz) of Band 33, the uplink/downlink band (i.e., 1880 MHz-1920 MHz) of Band 39, and a band for a Personal Handyphone System (PHS) (1884.5 MHz-1915.7 MHz based on the Japanese standard). Herein, the PHS corresponds to a plain portable phone system.

Therefore, as the frequency usage of Band 1 and Band 65 varies in order to ensure their coexistence with the band for the mobile satellite service (MSS), the coexistence of Band 33, Band 39, and the band for the PHS needs to be ensured accordingly. Furthermore, in order to increase the usability of the frequency, in case the method for protecting the PHS is changed from the limited RB allocation method to the A-MPR application method, the respective A-MPR values are required to be researched.

<Disclosure of the Specification>

Hereinafter, according to the exemplary embodiments of this specification, diverse solutions for ensuring the coexistence between the band for the mobile satellite service (MSS) and the adjacent bands will be described in detail.

1. UE-to-UE Coexistence Requirements of Band 1

In order to protect Band 33, Band 39, and the PHS band, which are adjacent to Band 1, Band 1 is required to achieve the following UE-to-UE coexistence requirements.

More specifically, the TDD-FDD UE-to-UE coexistence requirements for protecting Band 33 from Band 1 correspond to +1.6 dBm/5 MHz for the 1915 MHz-1920 MHz band and −15.5 dBm/5 MHz for the 1900 MHz-1915 MHz of Band 33. Also, the TDD-FDD UE-to-UE coexistence requirements for protecting Band 39 from Band 1 correspond to −15.5 dBm/5 MHz for the 1895 MHz-1900 MHz band and −40 dBm/MHz for the 1880 MHz-1895 MHz band of Band 39.

The general UE-to-UE coexistence requirement for protecting Band 34 from Band 1 corresponds to −50 dBm/MHz for the 2010 MHz-2025 MHz band of Band 34.

Furthermore, the UE-to-UE coexistence requirement for protecting the band for the PHS from Band 1 corresponds to −41 dBm/300 KHz for the 1884.5 MHz-1915.7 MHz band of the PHS band.

In order to protect Band 33, Band 34, Band 39, and the band for PHS, Band 1, which can coexist with the mobile satellite service (MSS), shall maintain the above-described UE-to-UE coexistence requirements. However, due to the usage of a newly added band, the standard for protecting Band 34 may be the same or mitigated. And, alternatively, when the PHS protection solution for increasing the usability of a new band is changed the application of A-MPR, research on the required A-MPR should be carried out.

2. Solution for Protecting Band 34

In order to protect Band 34 from the band for the mobile satellite service (MSS), A-MPR may be applied or an uplink resource block (RB) may be limited. Also, in case of applying the A-MPR, the application of PUCCH overprovisioning may be considered.

As described above, in case of applying the A-MPR or limiting the uplink RB, −50, −40, −30, and −15.5 dBm/MHz may be considered as the emission protection levels for Band 34. Also, a frequency distance between the boundary of the E-UTRA carrier and the band range may vary.

In order to protect Band 34, simulation results for the case of applying A-MPR are as shown below.

TABLE 13

| Case | E-UTRA Channel bandwidth (MHz) | Distance between E-UTRA carrier boundary and protection range (MHz) | Spurious emission protection level (dBm/MHz) | A-MPR (dB) |
|---|---|---|---|---|
| 1 | 5/10/15/20 | 0 | −50 | 17/17/17/17 |
|   |            |   | −40 | 15/14/14/14 |
|   |            |   | −30 | 12/11/11/11 |
|   |            |   | −15.5 | 5/4/4/3 |

TABLE 12

| E-UTRA band | Guard band | Spurious emission Frequency range (MHz) | Maximum level (dBm) | Measured bandwidth (MHz) |
|---|---|---|---|---|
| Band 1 | Bands 1, 5, 7, 8, 11, 18, 19, 20, 21, 22, 26, 27, 28, 31, 32, 38, 40, 41, 42, 43, 44 | FDL_low-FDL_high | −50 | 1 |
|   | Bands 3, 34 | FDL_low-FDL_high | −50 | 1 |
|   | Frequency range | 1880-1895 | −40 | 1 |
|   | Frequency range | 1895-1915 | −15.5 | 5 |
|   | Frequency rang' | 1915-1920 | +1.6 | 5 |
|   | Frequency range | 1839.9-1879.9 | −50 | 1 |

TABLE 13-continued

| Case | E-UTRA Channel bandwidth (MHz) | Distance between E-UTRA carrier boundary and protection range (MHz) | Spurious emission protection level (dBm/MHz) | A-MPR (dB) |
|---|---|---|---|---|
| 2 | 5/10/15/20 | 5 | −50 | 10/15/15/15 |
|   |            |   | −40 | 5/10/10/10 |
|   |            |   | −30 | 2/5/6/6 |
|   |            |   | −15.5 | 1/1/1/1 |
| 3 | 5/10/15/20 | 10 | −50 | 3/10/15/15 |
|   |            |    | −40 | 1/5/10/10 |
|   |            |    | −30 | 0/1/5/5 |
|   |            |    | −15.5 | 1/1/1/1 |

According to the simulation results shown in Table 13, in order to protect Band 34, it will be advantageous to perform a combined application of a guard band of 5 MHz and a coexistence requirement level of −40 dBm/MHz.

3. Solution for Protecting a PHS Band

In order to protect the PHS band from Band 1 or Band 65, which may coexist with the band for the mobile satellite service (MSS), the application of A-MPR according to NS_05 may be considered.

Figure 16:
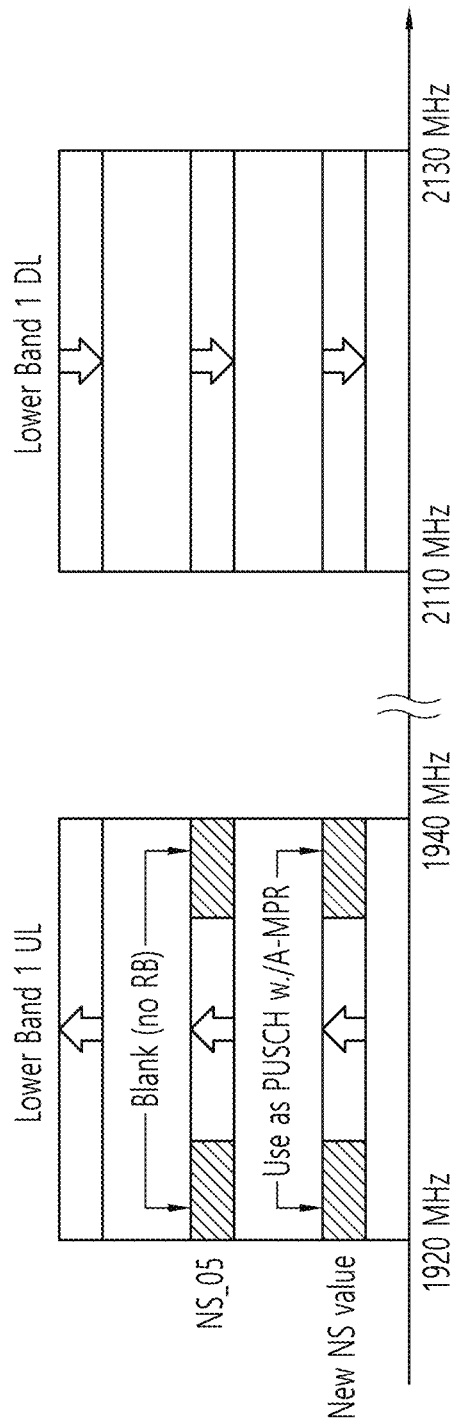
FIG. 16 shows an example of a resource block allocation of NS_05 being limited.

FIG. 16 shows an example of a resource block allocation of NS_05 being limited.

In case of applying A-MPR according to the conventional NS_05, the allocation for some of the resource blocks of a 1920 MHz-1940 MHz lower band region is limited as shown below in the following table.

TABLE 14

| 15 MHz channel bandwidth (Center frequency = 1932.5 MHz) | | | |
|---|---|---|---|
| $RB_{start}$ | 0-7 | 8-66 | 67-74 |
| $L_{CRB}$ | N/A | ≤MIN (30, 67-$RB_{start}$) | N/A |
| 20 MHz channel bandwidth (Center frequency = 1930 MHz) | | | |
| $RB_{start}$ | 0-23 | 24-75 | 76-99 |
| $L_{CRB}$ | N/A | ≤MIN (24, 76-$RB_{start}$) | N/A |

Herein, $RB_{start}$ indicates a start position of a resource block, and $L_{CRB}$ indicates a length of contiguously allocated resource blocks.

In order to enhance downlink efficiency, this method may apply over-provisioning of the PUCCH. However, limitations that prevent part of the uplink spectrums of 1920 MHz-1940 MHz from being used may still remain. Although the A-MPR is required in order to protect the PHS band, since the bandwidths that are available for usage are decreased, it will be disadvantageous in that the frequency usability of service providers having a low band of the conventional Band 1 may be decreased.

Therefore, in order to protect the PHS band while maintaining a protection level of −41 dBm/300 KHz, the application of a method allowing efficient RB allocation to be achieved in both of Band 1 and Band 65, which are adjacent to the PHS band, by defining a new network signal (NS_xx) for Band 65 and by applying a new A-MPR value may be considered.

Figure 17:
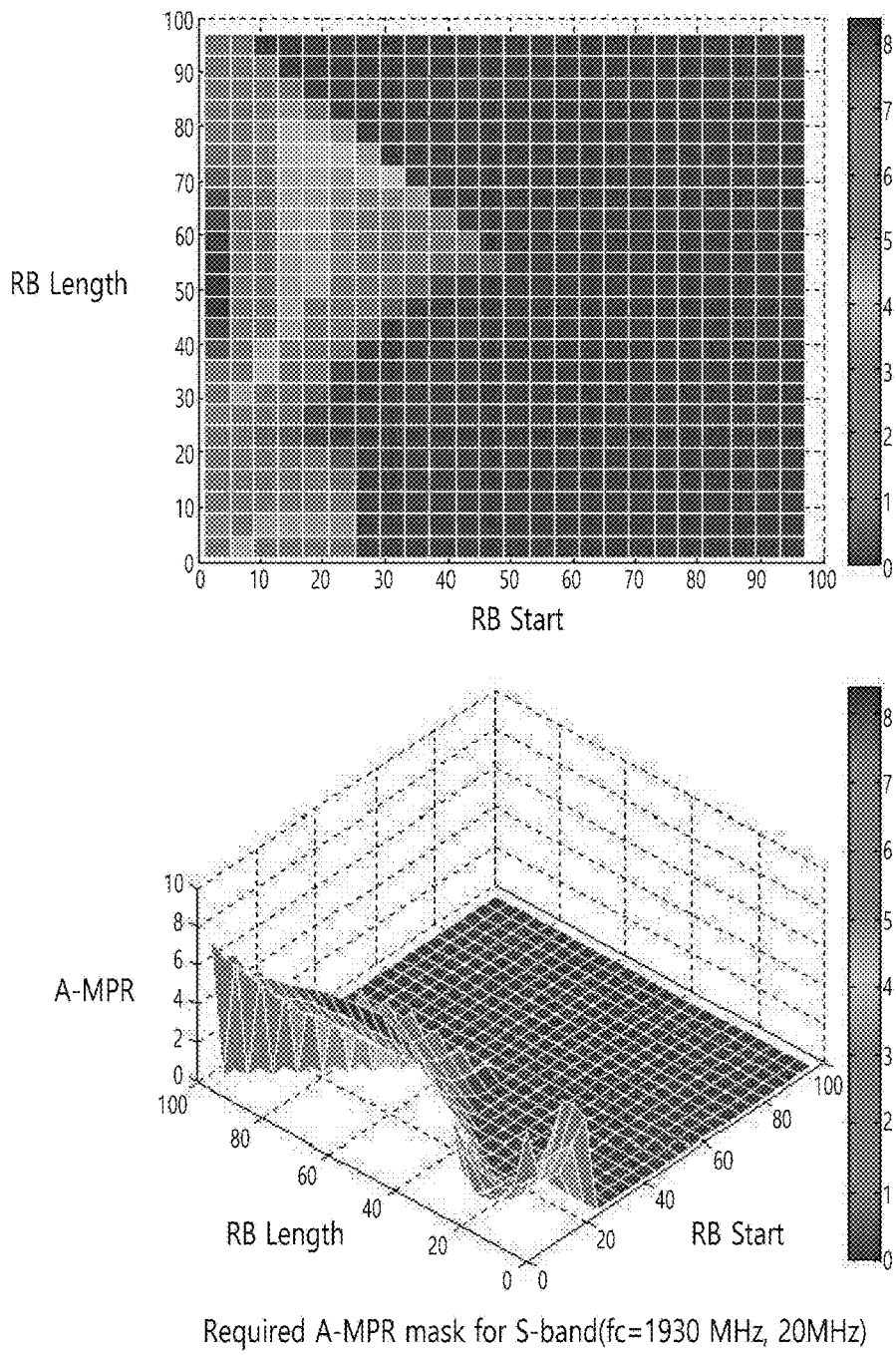
FIG. 17 and FIG. 18 are simulation results analyzing the A-MPR that is required for protecting the PHS band.
Figure 18:
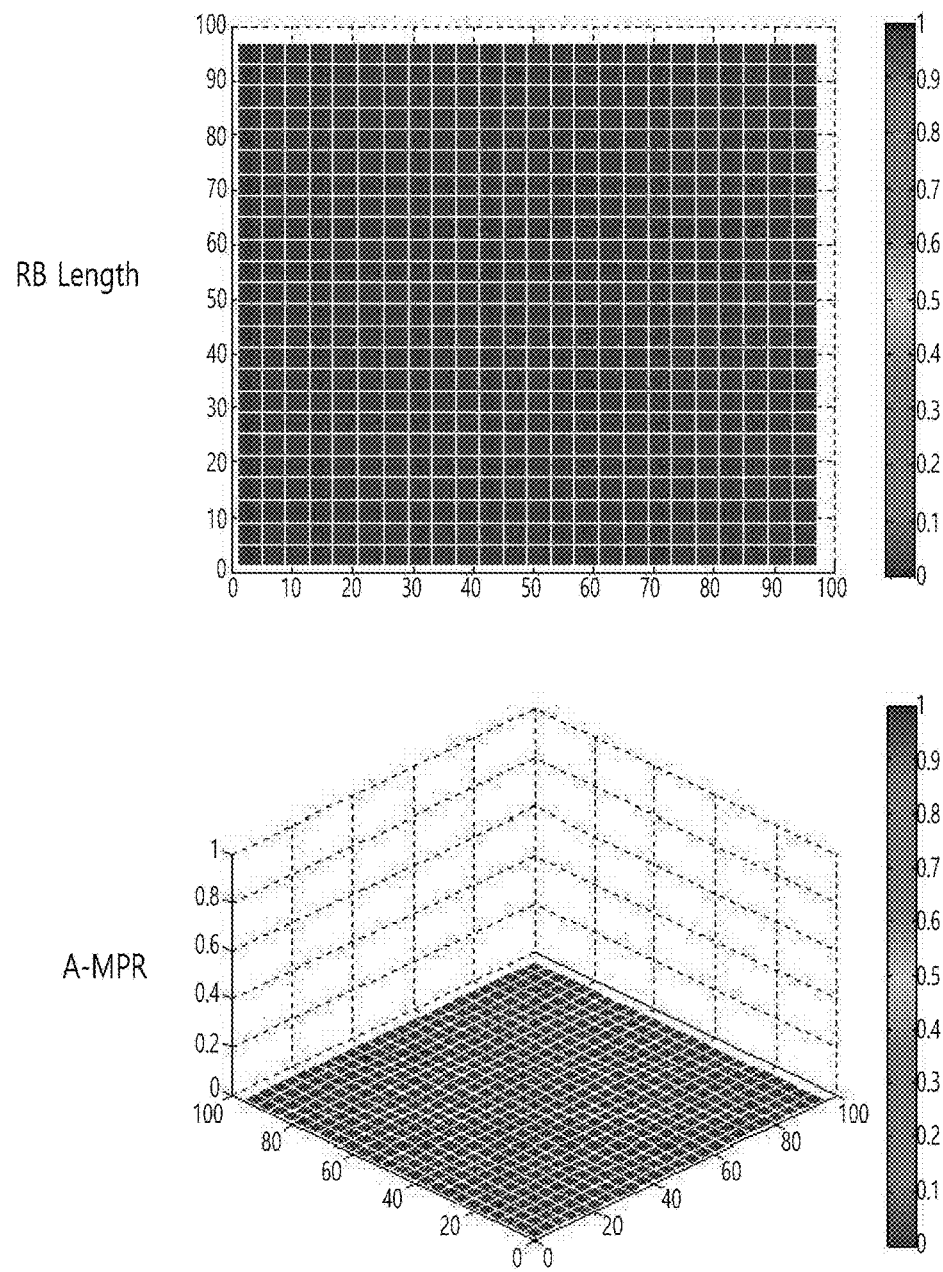
Figure 19A:
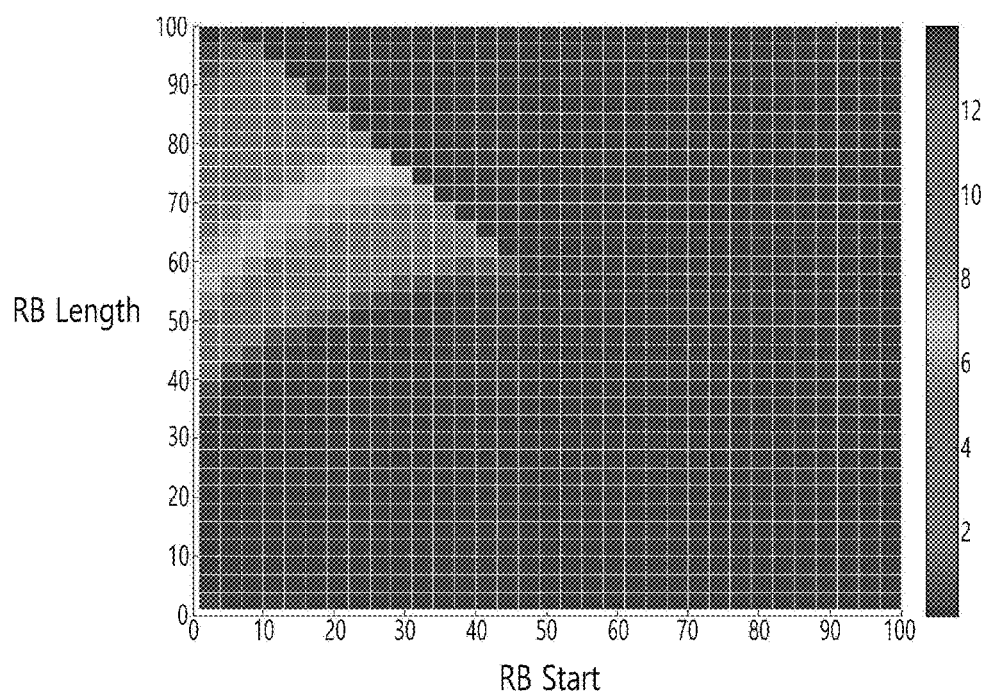
FIG. 19a to FIG. 22d are simulation results analyzing the A-MPR that is required for protecting Band 33 and Band 39.
Figure 19B:
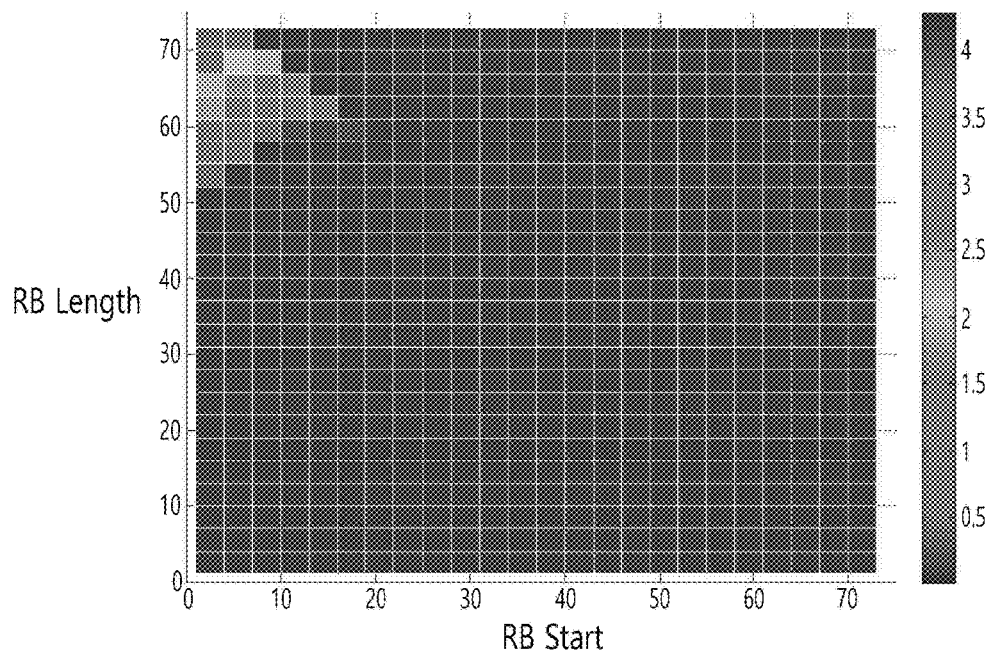
Figure 19C:
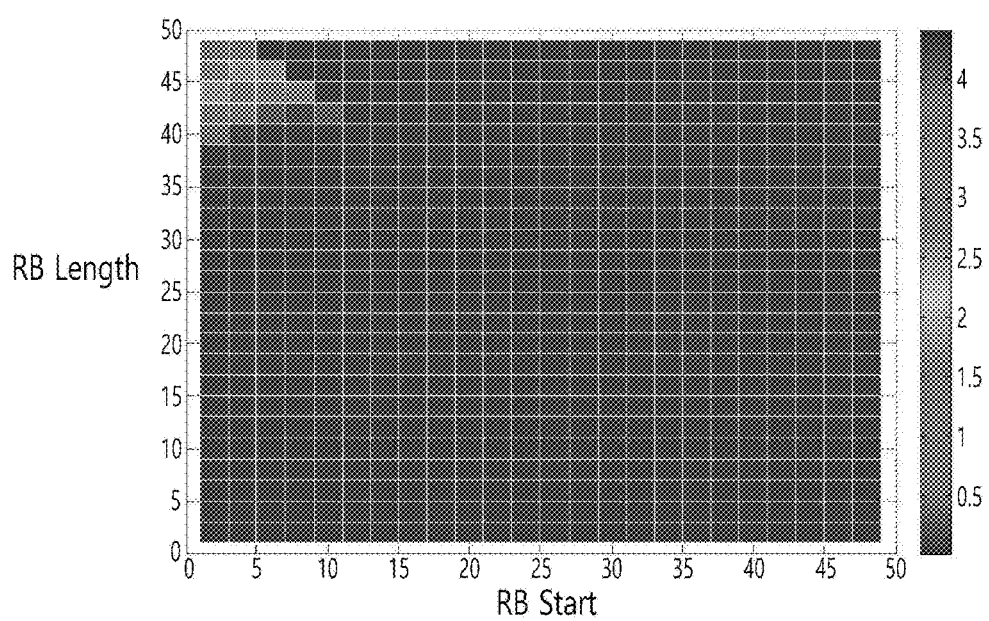
Figure 19D:
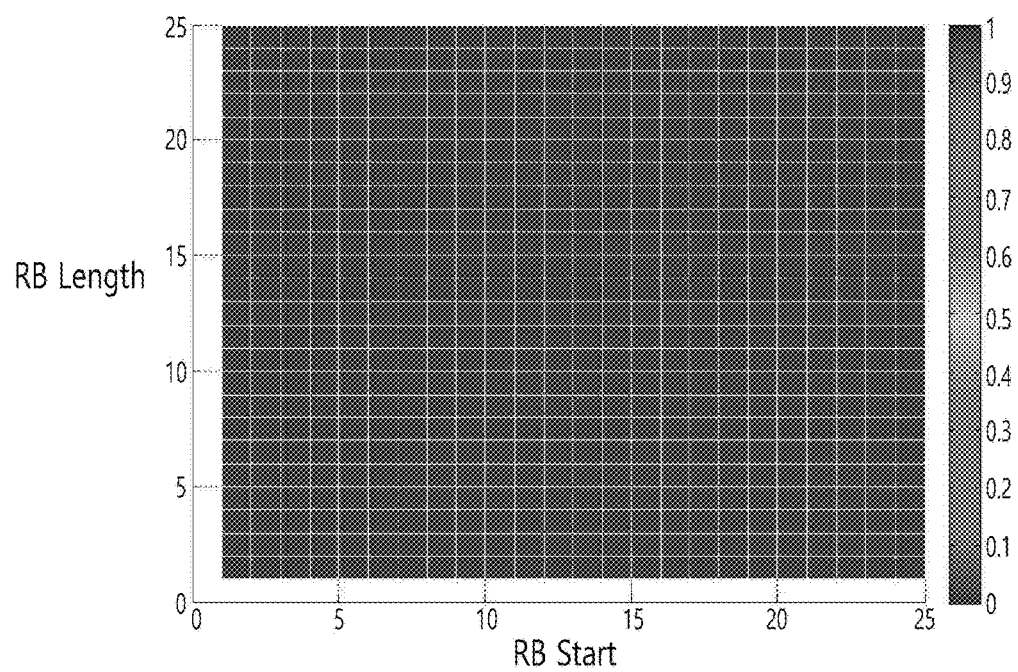
Figure 20A:
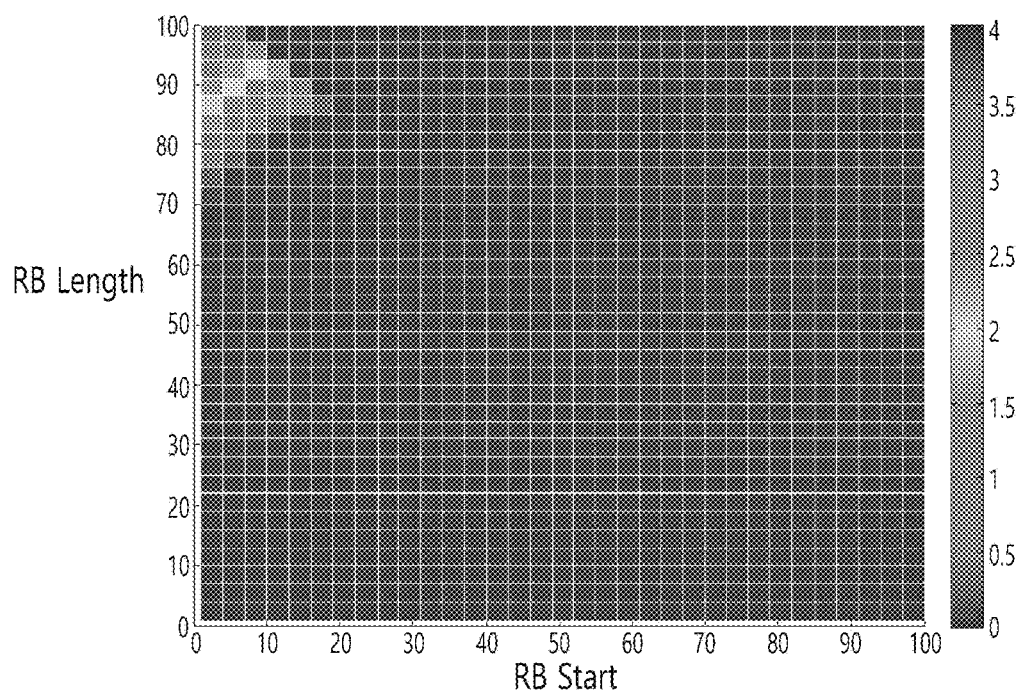
Figure 20B:
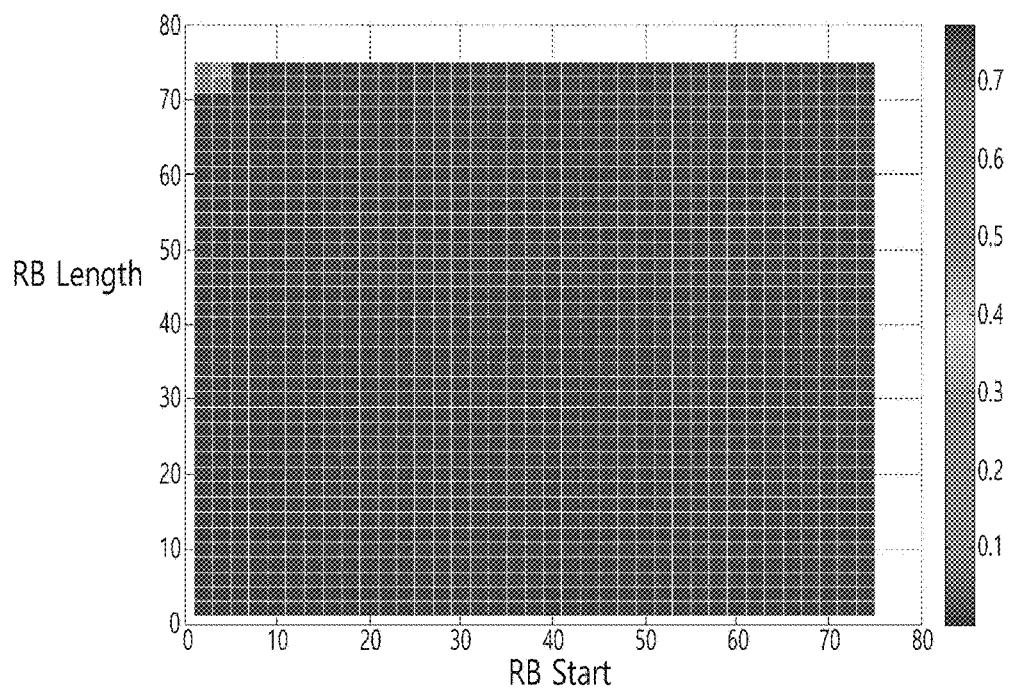
Figure 20C:
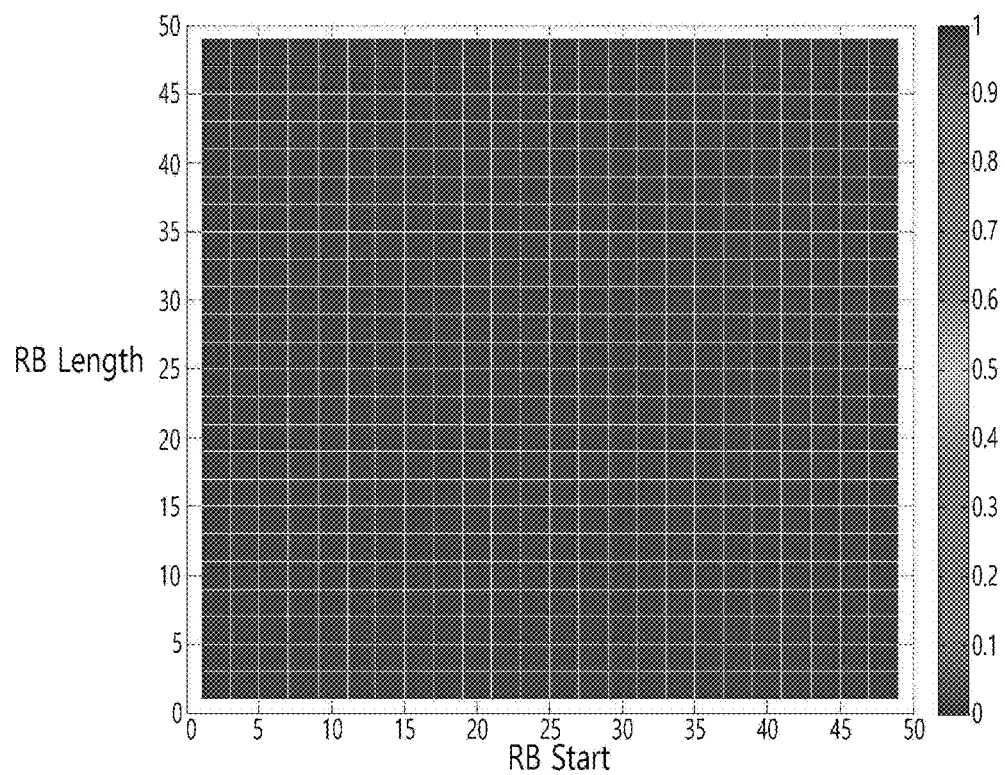
Figure 20D:
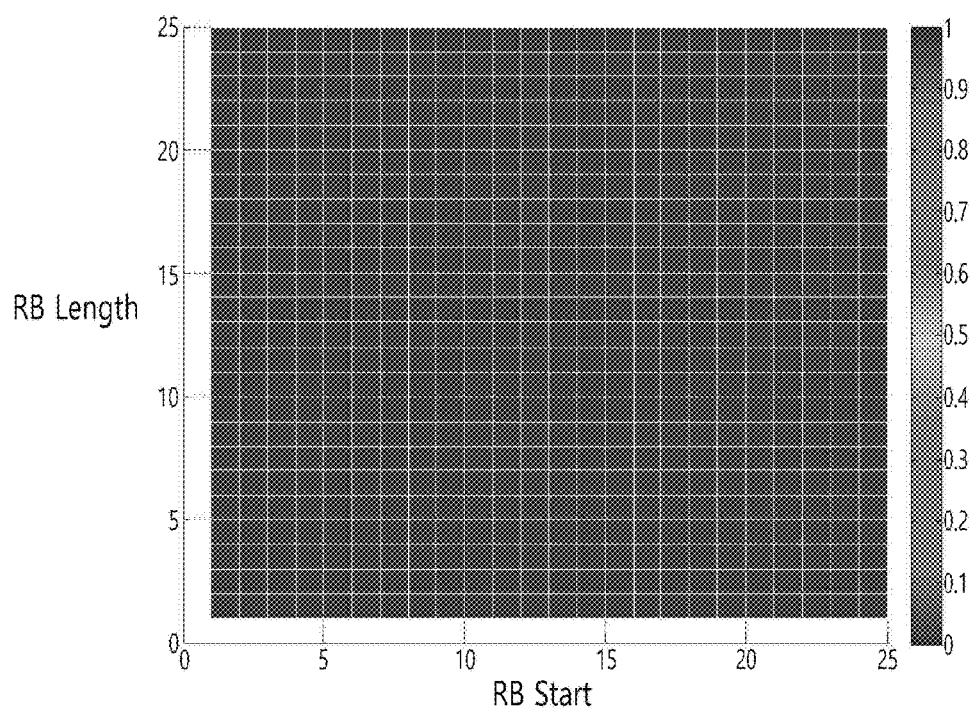
Figure 21A:
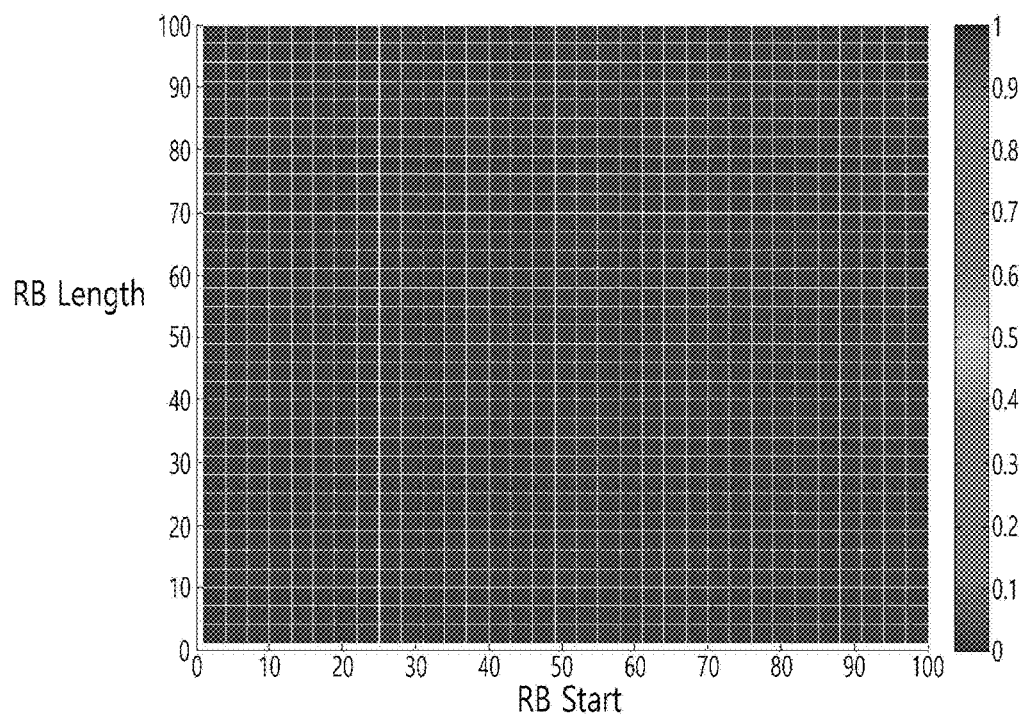
Figure 21B:
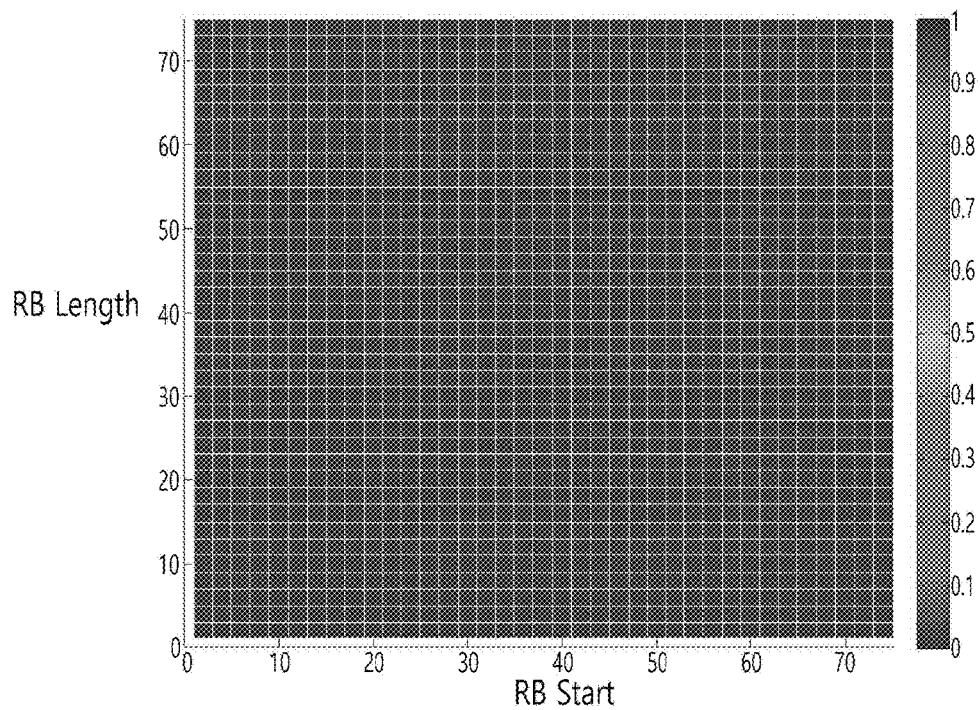
Figure 21C:
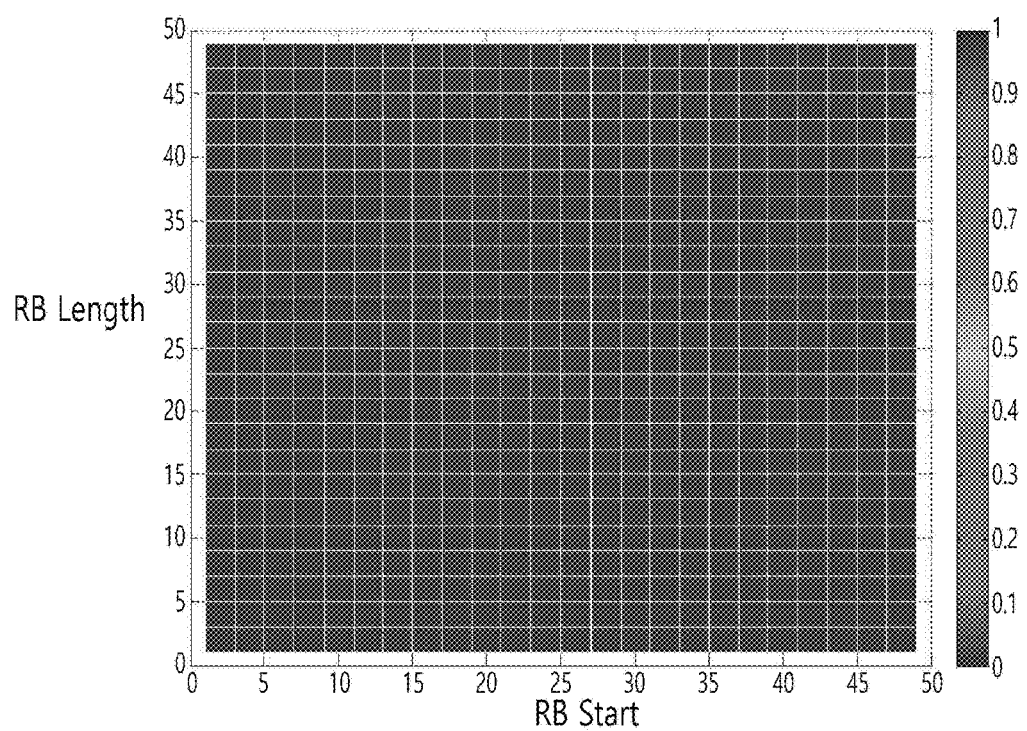
Figure 21D:
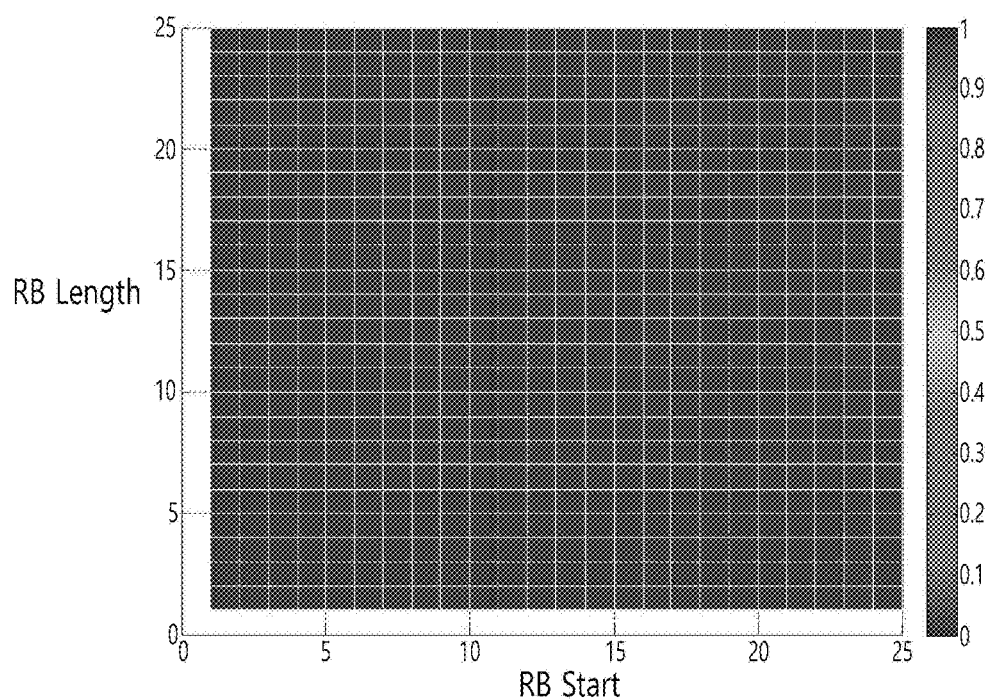
Figure 22A:
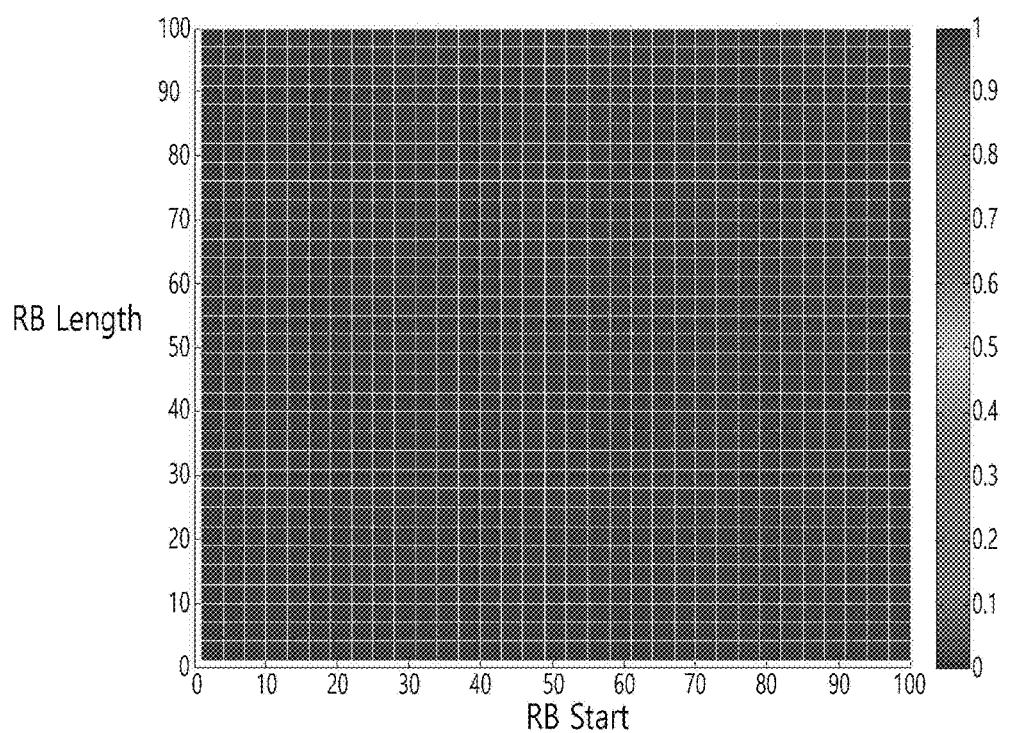
Figure 22B:
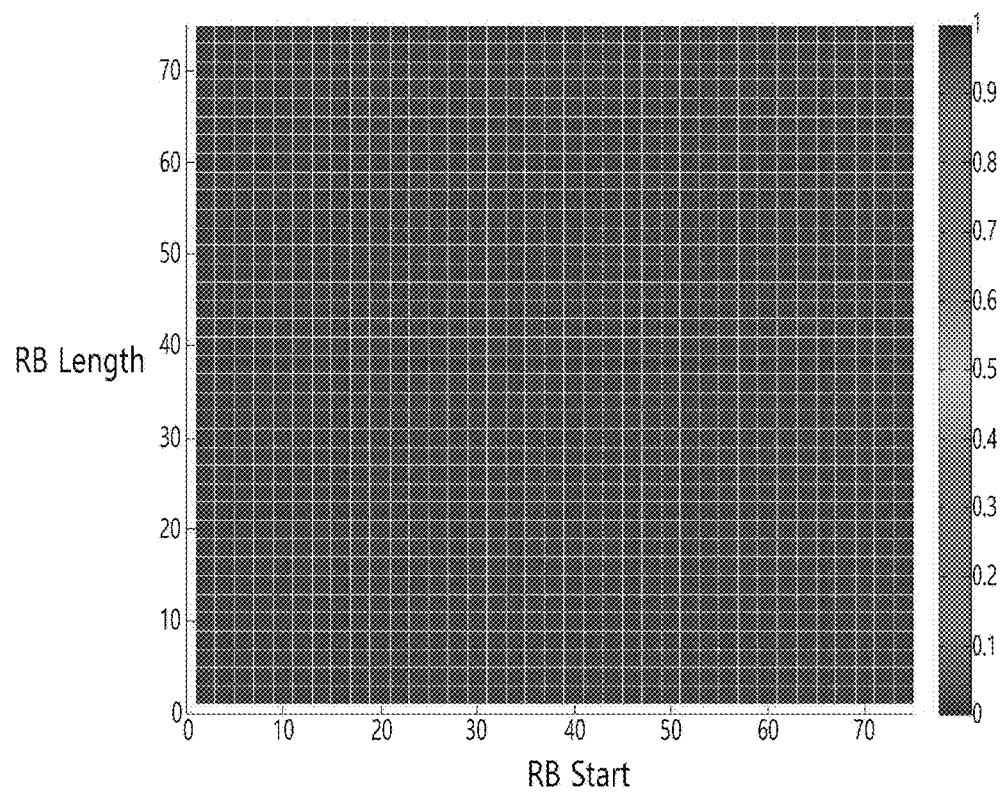
Figure 22C:
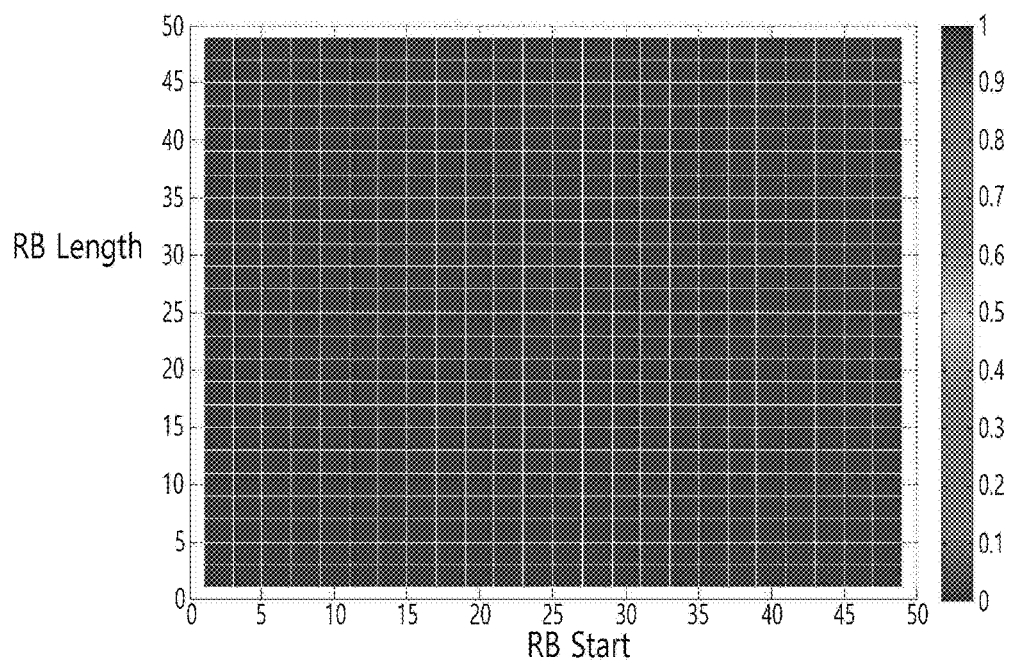
Figure 22D:
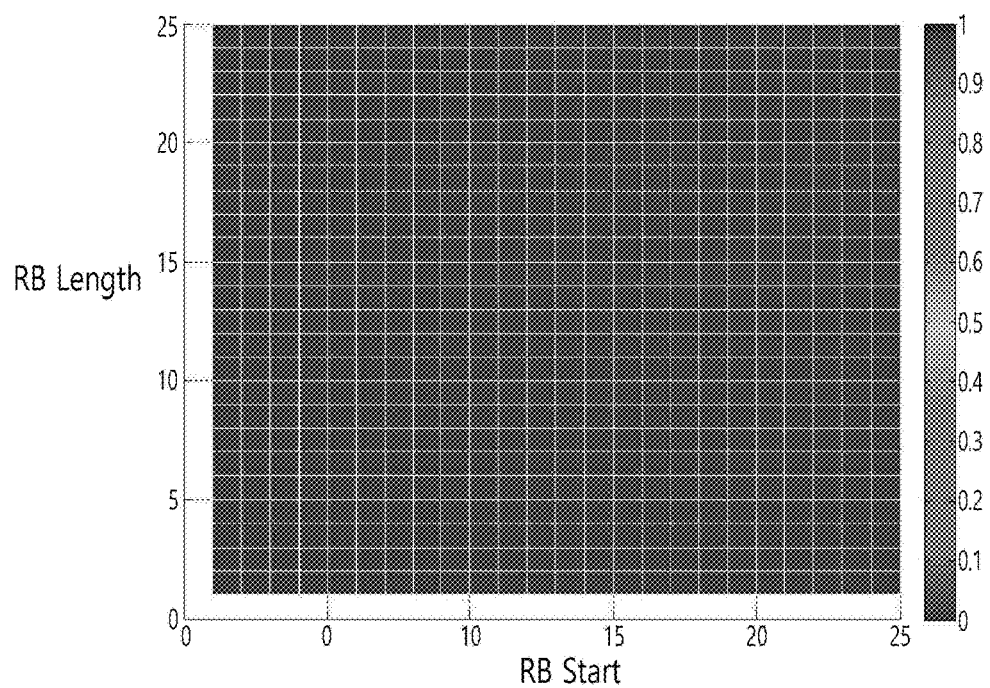

FIG. 17 and FIG. 18 are simulation results analyzing the A-MPR that is required for protecting the PHS band.

A-MPR values for protecting the PHS band that are obtained from simulation results of Case 1 and Case 2, which are respectively shown in FIG. 17 and FIG. 18, are as shown below in the following table.

TABLE 15

| Case | E-UTRA Channel bandwidth (MHz) | Distance between E-UTRA carrier boundary and protection range (MHz) | Spurious emission protection level (dBm/MHz) | A-MPR (dB) |
|---|---|---|---|---|
| 1 | 20 | 4.3 (=1920-1915.7) | −41dBm/300 kHz | 9 |
| 2 | 20 | 24.3 (=1940-1915.7) | −41dBm/300 kHz | 0 |

4. Solution for Protecting Band 33/Band 39

In order to protect Band 33 and Band 39 from Band 1 or Band 65, which may coexist with the band for the mobile satellite service (MSS), coexistence requirements corresponding to an approach method other than the coexistence requirements of Band 1 may be considered. As described above, the coexistence requirements of Band 1 correspond to a TDD-FDD coexistence approach method that does not apply A-MPR according to a new network signal (NS_xx).

Therefore, in order to protect Band 33 and Band 39, coexistence requirements applying A-MPR according to a new network signal (NS_xx) may be considered. Alternatively, applying a band guard that is similar to the approach method for protecting Band 34 may be considered.

Furthermore, the method that considers the A-MPR according to the new network signal (NS_xx) may be more advantageous in protecting adjacent bands than the method of re-using the TDD-FDD coexistence requirements.

FIG. 19a to FIG. 22d are simulation results analyzing the A-MPR that is required for protecting Band 33 and Band 39.

More specifically, FIG. 19a to FIG. 19d illustrate simulation results analyzing the A-MPR according to a start position of a resource block (RB_Start) and a length of the resource block (RB_Length) corresponding to cases where the spurious emission protection level is −50 dBm/MHz and the channel bandwidth is equal to 20 MHz (fc=1930 MHz), 15 MHz (fc=1927.5 MHz), 10 MHz (fc=1925 MHz), and 5 MHz (fc=1922.5 MHz), respectively.

FIG. 20a to FIG. 20d illustrate simulation results analyzing the A-MPR according to a start position of a resource block and a length of the resource block corresponding to cases where the spurious emission protection level is −40 dBm/MHz and the channel bandwidth is equal to 20 MHz (fc=1930 MHz), 15 MHz (fc=1927.5 MHz), 10 MHz (fc=1925 MHz), and 5 MHz (fc=1922.5 MHz), respectively.

FIG. 21a to FIG. 21d illustrate simulation results analyzing the A-MPR according to a start position of a resource block and a length of the resource block corresponding to cases where the spurious emission protection level is −30 dBm/MHz and the channel bandwidth is equal to 20 MHz (fc=1930 MHz), 15 MHz (fc=1927.5 MHz), 10 MHz (fc=1925 MHz), and 5 MHz (fc=1922.5 MHz), respectively.

Furthermore, FIG. 22a to FIG. 22d illustrate simulation results analyzing the A-MPR according to a start position of a resource block and a length of the resource block corresponding to cases where the spurious emission protection level is −15.5 dBm/MHz and the channel bandwidth is equal to 20 MHz (fc=1930 MHz), 15 MHz (fc=1927.5 MHz), 10 MHz (fc=1925 MHz), and 5 MHz (fc=1922.5 MHz), respectively.

A-MPR values for protecting Band 33 and Band 39 that are obtained from simulation results, which are respectively shown in FIG. 19 to FIG. 22, are as shown below in the following table.

TABLE 16

| Case | E-UTRA Channel bandwidth (MHz) | Distance between E-UTRA carrier boundary and protection range (MHz) | Spurious emission protection level (dBm/MHz) | A-MPR (dB) |
|---|---|---|---|---|
| 1 | 5/10/15/20 | 20 MHz | −50 | 0/5/5/13 |
|   |   |   | −40 | 0/0/1/4 |
|   |   |   | −30 | 0/0/0/0 |
|   |   |   | −15.5 | 0/0/0/0 |

Figure 23:
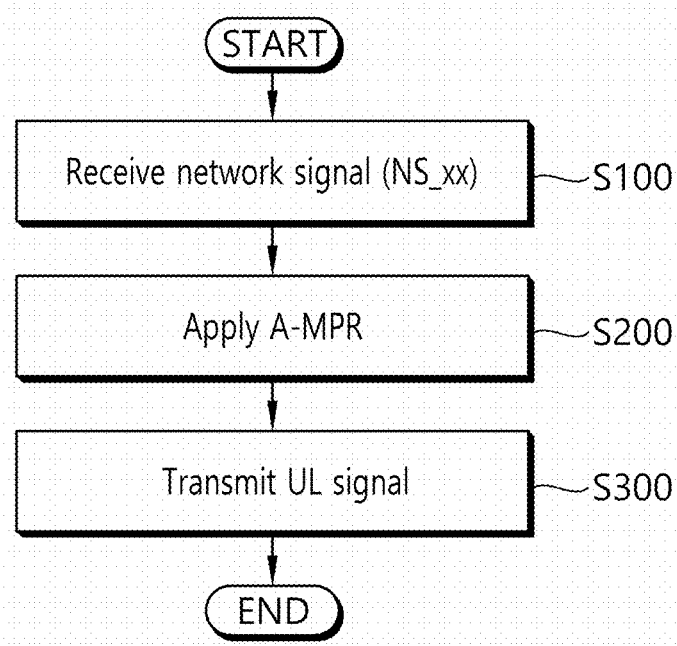
FIG. 23 is a flow chart showing a method for transmitting an uplink signal according to this specification.

FIG. 23 is a flow chart showing a method for transmitting an uplink signal according to this specification.

Referring to FIG. 23, a user equipment 100 receives a network signal for transmission power (S100). Herein, when the user equipment 100 transmits an uplink signal through an uplink carrier within an uplink band, which overlaps with part of the band for the mobile satellite service (MSS), the network signal may correspond to a network signal that can limit the transmission power in a case where the uplink carrier may cause interference to a PHS band. Additionally, the uplink carrier that is included in the uplink band, which partially overlaps with the band for the mobile satellite service (MSS), and that may cause interference to the PHS band may correspond to 1920 MHz-1940 MHz. Moreover, when the user equipment 100 transmits an uplink signal through an uplink carrier within an uplink band, which is adjacent to both Band 33 and Band 39, the network signal may correspond to a network signal that can limit the transmission power in a case where the uplink signal may cause interference to any one of Band 33 and Band 39.

Most particularly, in case the band that overlaps with the band for the mobile satellite service (MSS) corresponds to Band 65, the network signal may correspond to a new network signal (NS_xx) that is different from NS_05. Additionally, even in case the band that is adjacent to both Band 33 and Band 39 corresponds to Band 65, the network signal may correspond to a new network signal (NS_xx) that is different from NS_05. As described above, when the transmission power is limited in accordance with the network signal NS_05, the new network signal may correspond to a signal that allows resource block allocation to be performed by applying A-MPR for a frequency in which the resource block allocation is limited.

The user equipment 100 determines the transmission power by applying the A-MPR based on the received network signal (S200). Most particularly, in case the band that is adjacent to both Band 33 and Band 39 corresponds to Band 65, a guard band may be additionally determined based on the network signal. Herein, in case the band that overlaps with the band for the mobile satellite service (MSS) corresponds to Band 65, and in case the frequency distance between a boundary frequency of the overlapping uplink band and the PHS band is equal to 4.3 MHz, the A-MPR value may be equal to 9 dB. Additionally, in case the A-MPR is applied, the spurious emission protection level for the PHS band of the overlapping uplink band may correspond to −41 dBm/300 kHz. Furthermore, in case the band that is adjacent to both Band 33 and Band 39 corresponds to Band 65, in case the bandwidth of the uplink carrier is equal to 15 MHz, and in case the spurious emission protection level for the E-UTRA band 33 and the E-UTRA band 39 of the adjacent (or neighboring) uplink band corresponds to −40 dBm/MHz, the guard band may correspond to 20 MHz, and the A-MPR value may be equal to 1 dB.

Finally, the user equipment 100 transmits an uplink signal through the uplink carrier in accordance with the determined transmission power (S300).

Embodiment of the present invention may be implemented through various means. For example, the embodiments of the present invention may be implemented by hardware, firmware, software, or a combination thereof.

According to hardware implementation, the method according to the embodiments of the present invention may be implemented using Application Specific Integrated Circuits (ASICs), digital signal processors (DSPs), digital signal processing devices (DSPDs), programmable logic devices (PLDs), field programmable gate arrays (FPGAs), processors, controllers, micro-controllers, microprocessors.

According to firmware or software implementation, the method according to the embodiments of the present invention may be implemented in the form of a module, a procedure or a function to perform the above functions or operation. A software code is stored in a memory unit so that the software code may be driven by a processor. The memory unit may be located inside or outside the processor to exchange data with the processor by various know means. The wireless communication system according to an embodiment of the present invention will be described with reference to FIG. 24.

Figure 24:
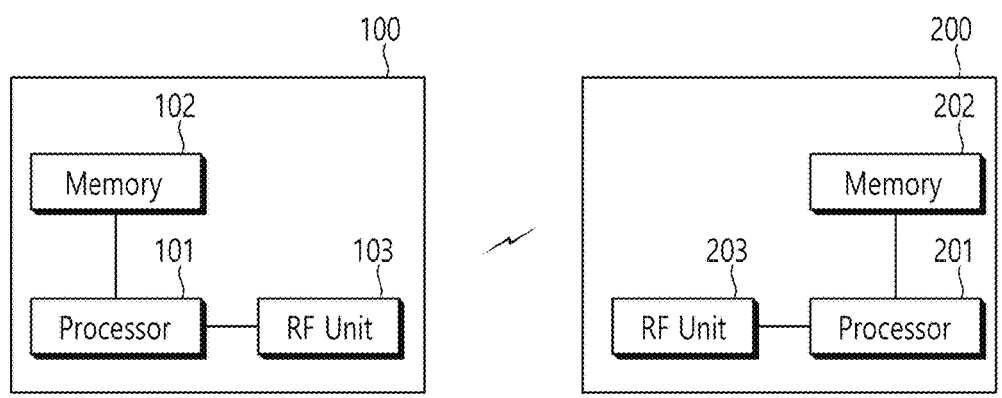
FIG. 24 is a block diagram illustrating a wireless communication system according to an embodiment of the present invention.

FIG. 24 is a block diagram illustrating a wireless communication system according to an embodiment of the present invention.

A base station 200 includes a processor 201, a memory 202, and a radio frequency (RF) unit 203. The memory 202 is connected to the processor 201 to store various information for driving the processor 201. The RF unit 203 is connected to the processor 201 to transmit and/receive a wireless signal. The processor 201 implements a suggested function, procedure, and/or method. An operation of the base station 200 according to the above embodiment may be implemented by the processor 201.

A user equipment 100 includes a processor 101, a memory 102, and an RF unit 103. The memory 102 is connected to the processor 101 to store various information for driving the processor 101. The RF unit 103 is connected to the processor 101 to transmit and/receive a wireless signal. The processor 101 implements a suggested function, procedure, and/or method. An operation of the wireless 100 according to the above embodiment may be implemented by the processor 101.

A processor may include an application-specific integrated circuit (ASIC), another chipset, a logic circuit, and/or a data processor. A memory may include read-only memory (ROM), random access memory (RAM), a flash memory, a memory card, a storage medium, and/or other storage devices. An RF unit may include a baseband circuit to process an RF signal. When the embodiment is implemented, the above scheme may be implemented by a module (procedure, function, and the like) to perform the above function. The module is stored in the memory and may be implemented by the processor. The memory may be located inside or outside the processor, and may be connected to the processor through various known means.

In the above exemplary system, although methods are described based on a flowchart including a series of steps or blocks, the present invention is limited to an order of the steps. Some steps may be generated in the order different from or simultaneously with the above other steps. Further, it is well known to those skilled in the art that the steps included in the flowchart are not exclusive but include other steps or one or more steps in the flowchart may be eliminated without exerting an influence on a scope of the present invention.

What is claimed is:

1. A method for transmitting an uplink signal by a user equipment, comprising:
   receiving a network signal for limiting transmission power,
   wherein the network signal is received when the uplink signal is transmitted through an uplink carrier within an uplink band overlapping with part of a mobile satellite service (MSS) band such that the uplink signal is likely to cause interference to a personal handyphone system (PHS) band;
   determining a transmission power by adopting additional maximum power reduction (A-MPR) based on the received network signal; and
   transmitting the uplink signal through the uplink carrier in accordance with the determined transmission power,
   wherein when the uplink band corresponds to evolved-universal terrestrial radio access (E-UTRA) band 65, a value being indicated by the network signal is different from a value being indicated by a network signal for the E-UTRA band 1 that is positioned to be adjacent to the MSS band.

2. The method of claim 1, wherein the E-UTRA band 65 overlaps with part of the E-UTRA band 1.

3. The method of claim 1, wherein the network signal corresponds to a network signal allowing resource block allocation to be performed by applying the A-MPR for a frequency in which the resource block allocation is limited, when the transmission power is limited in accordance with the network signal for the E-UTRA band 1.

4. The method of claim 1, wherein, when a frequency distance between a boundary frequency of the uplink band and the PHS band is equal to 4.3 MHz, a value of the A-MPR is equal to 9 dB.

5. The method of claim 1, wherein a spurious emission protection level for the PHS band of the uplink band corresponds to −41 dBm/300 kHz.

6. The method of claim 1, wherein the uplink carrier for transmitting the uplink signal corresponds to 1920 MHz-1940 MHz.

7. A method for transmitting an uplink signal by a user equipment, comprising:
   receiving a network signal for limiting transmission power,
   wherein the network signal is received, when the uplink signal is transmitted through an uplink carrier within an uplink band being adjacent to both an evolved-universal terrestrial radio access (E-UTRA) band 33 and a E-UTRA band 39 such that the uplink signal is likely to cause interference to any one of the E-UTRA\ band 33 and E-UTRA band 39;
   determining a transmission power by adopting additional maximum power reduction (A-MPR) based on the received network signal;
   determining a guard band based on the received network signal; and
   transmitting the uplink signal through the uplink carrier in accordance with the determined transmission power and guard band,
   wherein when the uplink band corresponds to E-UTRA band 65, a value being indicated by the network signal is different from a value being indicated by a network signal for E-UTRA band 1 that is positioned to be adjacent to the MSS band.

8. The method of claim 7, wherein, when a bandwidth of the uplink carrier is equal to 15 MHz, when a spurious emission protection level for the E-UTRA band 33 and the E-UTRA band 39 of the uplink band corresponds to −40 dBm/MHz, the guard band corresponds to 20 MHz, and a value of the A-MPR value is equal to 1 dB.

9. A user equipment for transmitting an uplink signal, comprising:
   a radio frequency (RF) unit configured to transmit and receive radio signals through a band overlapping with part of a mobile satellite service (MSS) band; and
   a processor configured to control the RF unit,
   wherein the processor controls the RF unit thereby:
      receiving a network signal for limiting transmission power,
      wherein the network signal is received when the uplink signal is transmitted through an uplink carrier within an uplink band overlapping with part of a mobile satellite service (MSS) band such that the uplink signal is likely to cause interference to a personal handyphone system (PHS) band,
      determining a transmission power by adopting additional maximum power reduction (A-MPR) based on the received network signal, and
      transmitting the uplink signal through the uplink carrier in accordance with the determined transmission power,
   wherein when the uplink band corresponds to evolved-universal terrestrial radio access (E-UTRA) band 65, a value being indicated by the network signal is different from a value being indicated by a network signal for the E-UTRA band 1 that is positioned to be adjacent to the MSS band.

10. The user equipment of claim 9, wherein the E-UTRA band 65 overlaps with part of the E-UTRA band 1.

11. The user equipment of claim 9, wherein the network signal corresponds to a network signal allowing resource block allocation to be performed by applying the A-MPR for a frequency in which the resource block allocation is limited, when the transmission power is limited in accordance with the network signal for the E-UTRA band 1.

12. The user equipment of claim 9, wherein, when a frequency distance between a boundary frequency of the uplink band and the PHS band is equal to 4.3 MHz, a value of the A-MPR is equal to 9 dB.

13. The user equipment of claim 9, wherein a spurious emission protection level for the PHS band of the uplink band corresponds to −41 dBm/300 kHz.

14. The user equipment of claim 9, wherein the uplink carrier for transmitting the uplink signal corresponds to 1920 MHz-1940 MHz.

15. A user equipment for transmitting an uplink signal, comprising:
   a radio frequency (RF) unit configured to transmit and receive radio signals through a band being adjacent to both evolved-universal terrestrial radio access (E-UTRA) band 33 and E-UTRA band 39; and
   a processor configured to control the RF unit,
   wherein the processor controls the RF unit thereby:
      receiving a network signal for limiting transmission power,
      wherein the network signal is received, when the uplink signal is transmitted through an uplink carrier within an uplink band being adjacent to both an evolved-universal terrestrial radio access (E-UTRA) band 33 and a E-UTRA band 39 such that the uplink signal is likely to cause interference to any one of the E-UTRA\ band 33 and E-UTRA band 39, determining a transmission power by adopting additional maximum power reduction (A-MPR) based on the received network signal, determining a guard band based on the received network signal, and transmitting the uplink signal through the uplink carrier in accordance with the determined transmission power and guard band, wherein when the uplink band corresponds to E-UTRA band 65, a value being indicated by the network signal is different from a value being indicated by a network signal for E-UTRA band 1 that is positioned to be adjacent to the MSS band.

16. The user equipment of claim 15, wherein, when a bandwidth of the uplink carrier is equal to 15 MHz, when a spurious emission protection level for the E-UTRA band 33 and the E-UTRA band 39 of the uplink band corresponds to −40 dBm/MHz, the guard band corresponds to 20 MHz, and a value of the A-MPR value is equal to 1 dB.

\* \* \* \* \*